(12) United States Patent
Borman et al.

(10) Patent No.: US 7,386,854 B2
(45) Date of Patent: Jun. 10, 2008

(54) COMPUTER SYSTEM FOR DETECTING OBJECT UPDATES

(75) Inventors: Samuel David Borman, Southsea (GB); Edward John Slattery, Winchester (GB)

(73) Assignee: International Business Machines, Incorporation, Armonk, NY (US)

( * ) Notice: Subject to any disclaimer, the term of this patent is extended or adjusted under 35 U.S.C. 154(b) by 765 days.

(21) Appl. No.: 10/176,794

(22) Filed: Jun. 21, 2002

(65) Prior Publication Data
US 2003/0005027 A1    Jan. 2, 2003

(30) Foreign Application Priority Data
Jun. 29, 2001    (GB) ................... 0115965.6

(51) Int. Cl.
*G06F 3/00*    (2006.01)
*G06F 12/00*    (2006.01)

(52) U.S. Cl. ...................... 719/310; 707/206

(58) Field of Classification Search ................ 719/316, 719/310; 707/206
See application file for complete search history.

(56) References Cited

U.S. PATENT DOCUMENTS

| | | | | |
|---|---|---|---|---|
| 5,900,001 | A * | 5/1999 | Wolczko et al. | 707/206 |
| 6,049,810 | A * | 4/2000 | Schwartz et al. | 707/206 |
| 6,249,793 | B1 * | 6/2001 | Printezis et al. | 707/206 |
| 6,694,346 | B1 * | 2/2004 | Aman et al. | 718/104 |
| 6,760,815 | B1 * | 7/2004 | Traversat et al. | 711/135 |
| 6,763,440 | B1 * | 7/2004 | Traversat et al. | 711/159 |
| 6,820,101 | B2 * | 11/2004 | Wallman | 707/206 |

* cited by examiner

*Primary Examiner*—William Thomson
*Assistant Examiner*—LeChi Truong
(74) *Attorney, Agent, or Firm*—Martin J. McKinley; Hoffman, Warnick & D'Alessandro, LLC

(57) ABSTRACT

A computer system is used to run one or more programs. It includes a memory having at least a first heap and a second heap in which objects are stored, with a first object being stored on the first heap. A write barrier is provided for detecting that said the first object has been updated by a program to include a first reference to a memory location in the second heap.

16 Claims, 14 Drawing Sheets

COMPUTER SYSTEM FOR DETECTING OBJECT UPDATES

FIELD OF THE INVENTION

The present invention relates to a computer system for running one or more programs and including a memory for storing objects, and in particular to the processing when one object updates a reference to another.

BACKGROUND OF THE INVENTION

Programs written in the Java programming language (Java is a trademark of Sun Microsystems Inc) are generally run in a virtual machine environment, rather than directly on hardware. Thus a Java program is typically compiled into byte-code form, and then interpreted by a Java virtual machine (VM) into hardware commands for the platform on which the Java VM is executing. The Java VM itself is an application running on the underlying operating system. An important advantage of this approach is that Java applications can then run on a very wide range of platforms.

Java is an object-oriented language. Thus a Java program is formed from a set of class files having methods that represent sequences of instructions. A hierarchy of classes can be defined, with each class inheriting properties (including methods) from those classes which are above it in the hierarchy. For any given class in the hierarchy, its descendants (i.e. below it) are called subclasses, whilst its ancestors (i.e. above it) are called superclasses. At run-time objects are created as instantiations of these class files, and indeed the class files themselves are effectively loaded as objects One Java object can call a method in another Java object. In recent years the Java environment has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard Java VM architecture is generally designed to run only a single application, although this can be multi-threaded. In a server environment used for database transactions and such-like, each transaction is typically performed as a separate application, rather than as different threads within an application. This is to ensure that every transaction starts with the Java VM in a clean state. In other words, a new Java VM is started for each transaction (i.e. for each new Java application). Unfortunately however this results in an initial delay in running the application (the reasons for this will be described in more detail later). The overhead due to this frequent starting and then stopping a Java VM as successive transactions are processed is significant, and seriously degrades the scalability of Java server solutions.

Various attempts have been made to mitigate this problem. EP-962860-A describes a process whereby one Java VM can fork into a parent and a child process, this being quicker than setting up a fresh Java VM. The ability to run multiple processes in a Java-like system, thereby reducing overhead per application, is described in "Processes in KaffeOS: Isolation, Resource Management, and Sharing in Java" by G back, W Hsieh, and J Another approach is described in "Oracle JServer Scalability and Performance" by Jeremy Litzt, July 1999. The JServer product available from Oracle Corporation, USA, supports the concept of multiple sessions (a session effectively representing a transaction or application), each session appears to its JServer session. Each individual session appears to its JServer client to be a dedicated conventional Java VM.

U.S. patent application Ser. No. 09/304160, filed Apr. 30, 1999 ("A long Running Reusable Extendible Virtual Machine"), assigned to IBM Corporation (IBM docket YOR9-1999-0170), discloses a virtual machine having two types of heap, a private heap and a shared heap. The former is intended primarily for storing application classes, whilst the latter is intended primarily for storing system classes and, as its name implies, is accessible to multiple VMs. A related idea is described in "Building a Java virtual machine for server applications: the JVM on OS/390" by Dillenberger et al, IBM Systems Journal, Vol 39/1, January 2000.

The above documents are focused primarily on the ability to easily run multiple Java VMs in parallel. A different (and potentially complementary) approach is based on a serial rather than parallel configuration. Thus it is desirable to run repeated transactions (i.e. applications) on the same Java VM, since this could avoid having to reload all the system classes at the start of each application. However, one difficulty with this is that each application expects to run on a fresh, clean, Java VM. There is a danger with serial re-use of a Java VM that the state left from a previous transaction somehow influences the outcome of a new transaction. This unpredictability is unacceptable in most circumstances.

U.S. provisional application No. 60/208268 filed May 31, 2000 in the name of IBM Corporation (IBM docket number YOR9-2000-0359) discloses the idea of having two heaps in a JVM. One of these is a transient heap, which is used to store transaction objects that will not persist into the next transaction, whilst a second, persistent, heap is used for storing objects, such as system objects, that will persist. This approach provides the basis for an efficient reset mechanism by deleting the transient heap.

This concept is developed in GB application 0027045.4, filed 6 Nov. 2000 in the name of IBM Corporation (IBM docket number GB9-2000-0101), which focuses particularly on the deletion of the transient heap. One difficulty that arises at reset is how to handle pointers from objects in the persistent heap to objects in the transient heap, since following reset and deletion of the transient heap, these pointers will no longer be valid. The general policy in the above application is that if such cross-heap pointers exist, the Java VM is no longer resettable, and so will normally have to be terminated.

However, it is possible that the objects in the persistent heap from which the cross-heap pointers originate are no longer live, but rather are waiting to be garbage collected (the process of garbage collection in Java is described in more detail below). It is clearly undesirable to terminate the Java VM as unresettable simply on the basis of a cross-heap pointer that could possibly be deleted. Therefore, as described in the above application, if any cross-heap pointers are found at reset, a garbage collection operation is performed, which will remove any objects that are no longer live. In many cases this will eliminate all the objects that have the cross-heap pointers, thereby allowing reset to proceed.

Although the approach in the GB 0027045.4 application is effective, it suffers from the problem that garbage collection is a relatively time-consuming operation. Thus if any cross-heap pointers are found, there is a significant wait while the garbage collection is performed in order to determine whether or not the Java VM is safe to reset. This wait is unfortunate, given that one of the main motivations for being able to reset the Java VM in the first place was to overcome the start-up delay when having to launching a new Java VM for each transaction.

SUMMARY OF THE INVENTION

Accordingly, the invention provides a computer system for running one or more programs and including a memory in which objects are stored, said system further including:

a card table containing multiple cards, each card corresponding to a portion of said memory; and a write barrier for detecting that a first object has been updated by a program to include a reference to a second object, and for marking the card that corresponds to the memory location of said second object.

In broad terms each card is simply a small region of memory, which corresponds to a much larger region of memory. The card is then marked if an object in its corresponding larger region of memory is referenced. This provides an effective record of memory usage, a form of memory map, to track objects which may potentially be live, because they are referenced by other objects. Scanning the card table can therefore provide a short cut to identifying live objects, compared to a full garbage collection.

It will be appreciated that there are many possibilities as regards the detailed structure of the card table, and this will typically depend on performance aspects. For example, if cards in the card table are contiguous with an order that matches the corresponding memory locations, access speed to the card table will be much greater since a card can be located in the card table directly from a given memory location. However, other configurations of the card table may also be adopted.

In the preferred embodiment, the computer memory is divided into at least first and second heaps, and a reset can be performed on the system, involving the deletion of all objects in the second heap. At such reset, any pointers from the first heap into the second heap (cross-heap pointers) become invalid, or put another way, the presence of any such cross-heap pointer prevents a valid reset operation.

Note that the first and second heaps do not need to be physically separate, but may for example be one heap logically partitioned into two or more heaps. In addition, there may be large number of logically separate heaps, and also a variety of different heap models, such as providing local heaps for threads. In this context a cross-heap pointer should simply be interpreted as a pointer from a first region of memory that is not being reset into a second region of memory that is being reset.

The main objective of the present invention is to allow a quick determination at reset of whether a cross-heap pointer is still live, without having to perform a full garbage collection. To this end, each card in the card table comprises first and second components. The first component is marked if an object in a corresponding memory location is updated to include a reference to another object. In the preferred embodiment, this first component is only marked if the object being updated is in the first heap, and the object being referenced is in the second heap. This approach therefore flags all cross-heap pointers. An alternative approach is simply to mark the cards for all updated objects (or optionally just those in the middleware heap) irrespective of the location of the objects they reference. This effectively defers checking whether the reference is a cross-heap pointer until the reset itself, which may be desirable for performance reasons.

Further in the preferred embodiment, the second component of the card table is marked if an object in a corresponding memory location is referenced from another object, providing the object being updated (i.e. the referencing object) is in the first heap (this is because references from the second heap should be deletable at reset, and so cannot make an object live). Preferably the second component of the card is only marked if the object being referenced is in the first heap. Alternatively it may be simpler to drop this requirement (so no testing of which heap contains the referenced object); in this case the marked cards corresponding to the second heap would simply be ignored at reset.

Note that in the preferred embodiment, the second component of a card is not marked if the object being updated and the object being referenced are in memory locations corresponding to a single card. This is because there must be some other reference to the card from outside for any object within it to be potentially live.

At reset itself, the second component of each card corresponding to a memory location referenced by the system stack or registers is marked. These locations are termed the roots, and represent live objects. Any other objects which are live must be referenced directly or directly from one of the roots. Thus by marking the roots, and also by using the write barrier to mark referenced objects, the second component of cards corresponding to all potentially live objects should have been marked.

This means that at reset the first component of each card corresponding to objects in the first heap is checked to see if it is marked, in other words, to see if an object in the corresponding portion of memory contains a cross-heap pointer. If so, it is determined if the second component of any such card is marked. If not, it is known that any objects in the portion of memory corresponding to the card cannot be live, and therefore any cross-heap pointer therein can be ignored. On the other hand, if the second component is marked, then the object containing the cross-heap pointer may still potentially be live, and so reset cannot proceed. In the preferred embodiment at this stage, a full garbage collection is performed, to allow a more accurate determination of which objects are live (the use of the card table conservatively indicates cards as live, in that any live object will imply its corresponding card is live, but the converse is not necessarily true, i.e. a live card does not mean that all, or indeed any, of its corresponding objects are actually live). If the garbage collection shows that the objects containing the cross-heap pointers are in fact not live, then the reset can proceed after all.

At reset, the first component of each card is restored to its initial (zero) value as part of such reset, in other words to its unmarked state. On the other hand, the second component of each card persists through reset, to mirror the fact that object references within the first heap can likewise persist through reset. The second component is only reset itself if a garbage collection is performed on the system, whereupon it is known exactly which objects are live, and the second component in the corresponding cards can therefore be marked accordingly. (Note that in this context reset of the second component is not back to its initial, completely unmarked state, but rather back to a state in which it is known to be fully current).

The invention further provides a method for running one or more programs on a computer system including a memory in which objects are stored, said method including the steps of:

providing a card table containing multiple cards, each card corresponding to a portion of said memory; and detecting with a write barrier that a first object has been updated by a program to include a reference to a second object, and marking the card that corresponds to the memory location of said second object.

The invention further provides a computer program product comprising instructions encoded on a computer readable medium for causing a computer to perform this method. A suitable computer readable medium may be a DVD or computer disk, or the instructions may be encoded in a signal transmitted over a network from a server. It will be appreciated that the method and computer program product of the invention will benefit from the same preferred features as the system of the invention.

BRIEF DESCRIPTION OF THE DRAWINGS

A preferred embodiment of the invention will now be described in detail by way of example only with reference to the following drawings.

DETAILED DESCRIPTION

Figure 1:
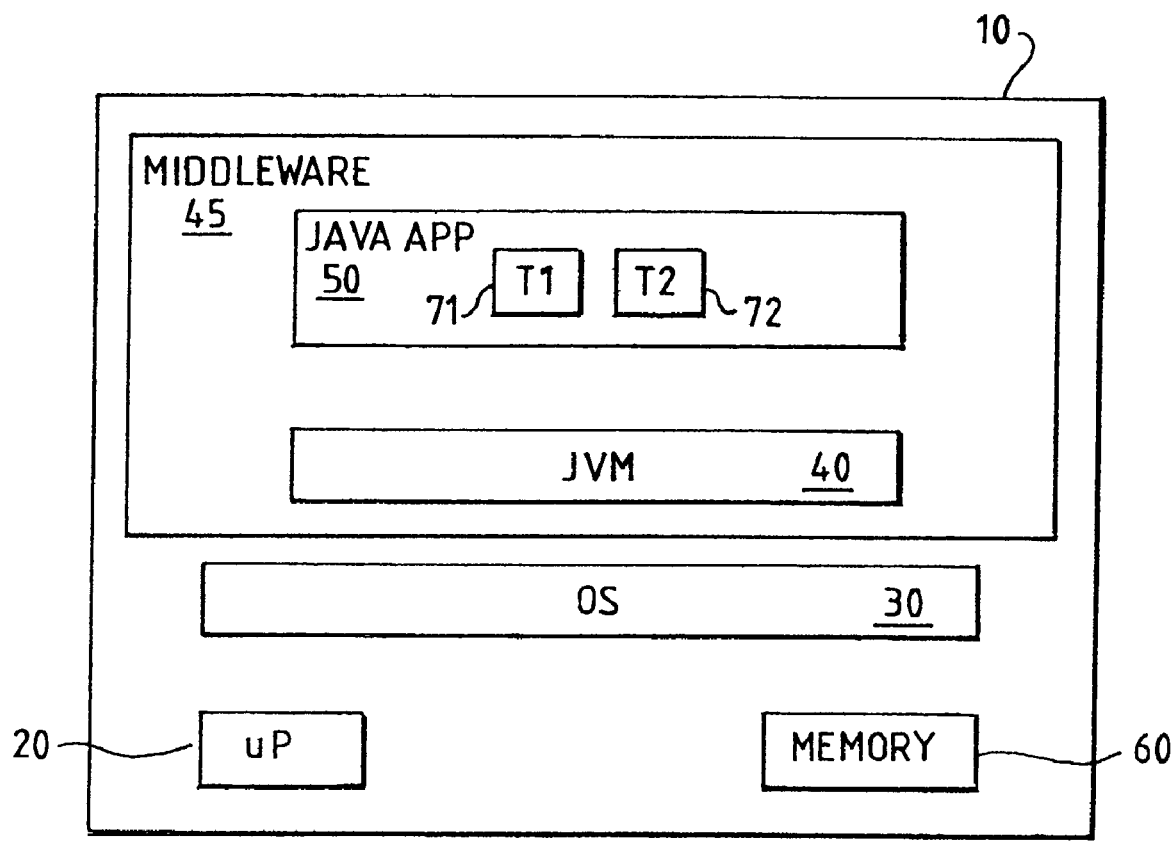
FIG. 1 shows a schematic diagram of a computer system supporting a Java Virtual Machine (VM)

FIG. 1 illustrates a computer system 10 including a (micro)processor 20 which is used to run software loaded into memory 60. The software can be loaded into the memory by various means (not shown), for example from a removable storage device such as a floppy disk, CD ROM, or DVD, or over a network such as a local area network (LAN), telephone/modem connection, or wireless link, typically via a hard disk drive (also not shown). Computer system runs an operating system (OS) 30, on top of which is provided a Java virtual machine (VM) 40. The Java VM looks like an application to the (native) OS 30, but in fact functions itself as a virtual operating system, supporting Java application 50. A Java application may include multiple threads, illustrated by threads T1 and T2 71, 72.

System 10 also supports middleware subsystem 45, for example a transaction processing environment such as CICS, available from IBM Corporation (CICS is a trademark of IBM Corporation). The middleware subsystem runs as an application or environment on operating system 30, and initiates the Java VM 40. The middleware also includes Java programming which acts to cause transactions as Java applications 50 to run on top of the Java VM 40. In accordance with the present invention, and as will be described in more detail below, the middleware can cause successive transactions to run on the same Java VM. In a typical server environment, multiple Java VMs may be running on computer system 10, in one or more middleware environments.

It will be appreciated that computer system 10 can be a standard personal computer or workstation, network computer, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

Figure 2:
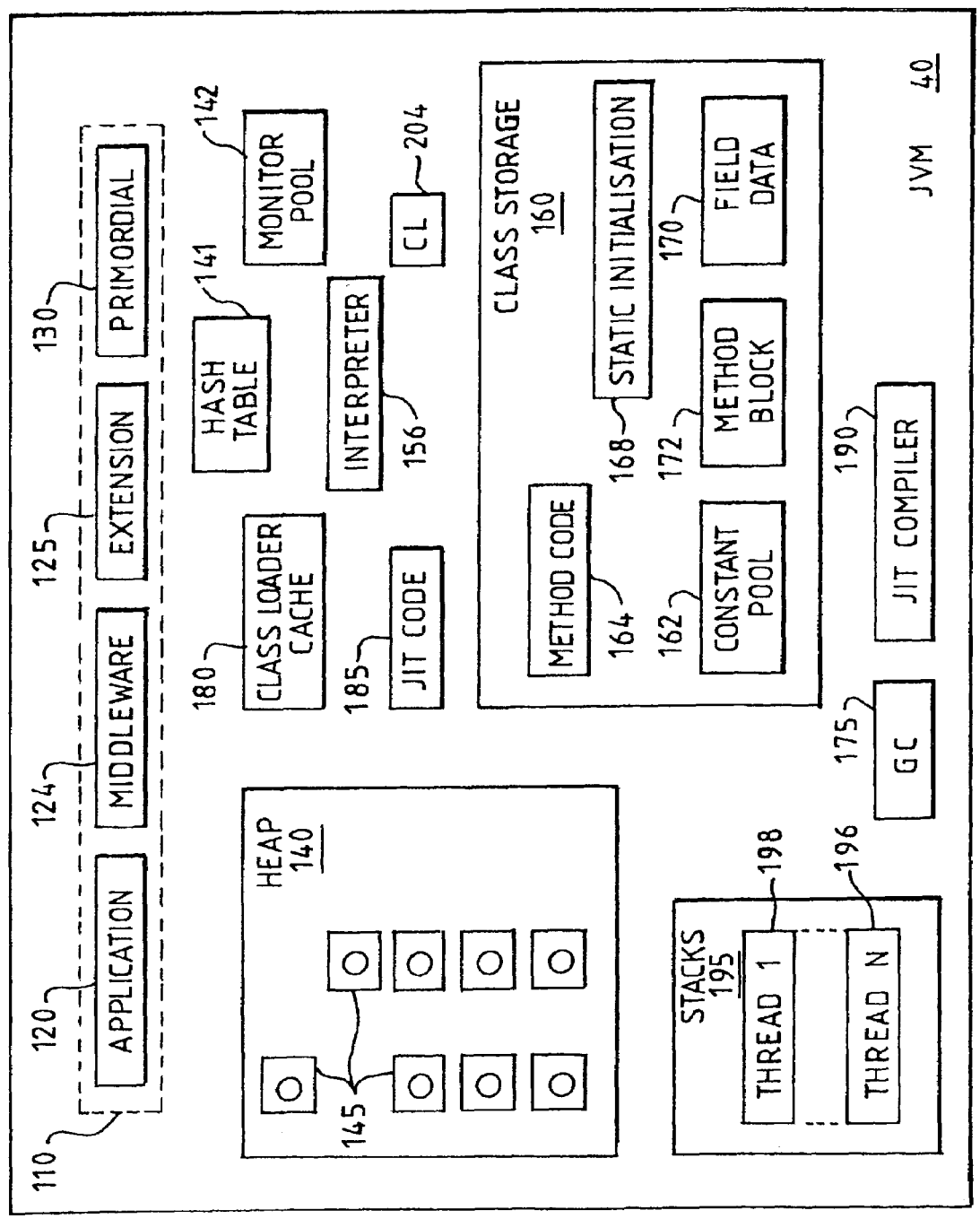
FIG. 2 is a schematic diagram of the internal structure of the Java VM.

FIG. 2 shows the structure of Java VM 40 in more detail (omitting some components which are not directly pertinent to an understanding of the present invention). The fundamental unit of a Java program is the class, and thus in order to run any application the Java VM must first load the classes forming and required by that application. For this purpose the Java VM includes a hierarchy of class loaders 110, which conventionally includes three particular class loaders, named Application 120, Extension 125, and Primordial 130. An application can add additional class loaders to the Java VM (a class loader is itself effectively a Java program). In the preferred embodiment of the present invention, a fourth class loader is also supported, Middleware 124.

For each class included within or referenced by a program, the Java VM effectively walks up the class loader hierarchy, going first to the Application class loader, then the Middleware loader, then the Extension class loader, and finally to the Primordial class loader, to see if any class loader has previously loaded the class. If the response from all of the class loaders is negative, then the JVM walks back down the hierarchy, with the Primordial class loader first attempting to locate the class, by searching in the locations specified in its class path definition. If this is unsuccessful, the Extension class loader then makes a similar attempt, if this fails the Middleware class loader tries. Finally, if this fails the Application class loader tries to load the class from one of the locations specified in its class path (if this fails, or if there is some other problem such as a security violation, the system returns an error). It will be appreciated that a different class path can be defined for each class loader.

The Java VM further includes a component CL 204, which also represents a class loader unit, but at a lower level. In other words, this is the component that actually interacts with the operating system to perform the class loading on behalf of the different (Java) class loaders 110.

Also present in the Java VM is a heap 140, which is used for storage of objects 145 (FIG. 2 shows the heap 140 only at a high level; see FIG. 5 below for more details). Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2). Although heap 140 is shared between all threads, typically for reasons of operational efficiency, certain portions of heap 140 can be assigned to individual threads, effectively as a small region of local storage, which can be used in a similar fashion to a cache for that thread.

The Java VM also includes a class storage area 160, which is used for storing information relating to the class files stored as objects in the heap 140. This area includes the method code region 164 for storing byte code for implementing application logic such as class method calls, and a constant pool 162 for storing strings and other constants associated with a class. The class storage area also includes a field data region 170 for sharing static variables (static in this case implies belonging to the class rather than individual instances of the class, or, to put this another way, shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag (not shown) to indicate whether or not they have been initialised.

FIG. 2 further shows a monitor pool 142. This contains a set of locks (monitors) that are used to control access to an object by different threads. Thus when a thread requires exclusive access to an object, it first obtains ownership of its corresponding monitor. Each monitor can maintain a queue of threads waiting for access to any particular object. Hash table 141 is used to map from an object in the heap to its associated monitor.

Another component of the Java VM is the interpreter 156, which is responsible for reading in Java byte code from loaded classes, and converting this into machine instructions for the relevant platform. From the perspective of a Java application, the interpreter effectively simulates the operation of a processor for the virtual machine.

Also included within the Java VM are class loader cache 180 and garbage collection (GC) unit 175. The former is effectively a table used to allow a class loader to trace those classes which it initially loaded into the Java VM. The class loader cache therefore allows each class loader to check whether it has loaded a particular class—part of the operation of walking the class loader hierarchy described above. Note also that it is part of the overall security policy of the Java VM that classes will typically have different levels of permission within the system based on the identity of the class loader by which they were originally loaded.

Garbage collection (GC) facility 175 is used to delete objects from heap 140 when those objects are no longer required. Thus in the Java programming language, applications do not need to specifically request or release memory, rather this is controlled by the Java VM. Therefore, when Java application 50 creates an object 145, the Java VM secures the requisite memory resource. Then, when Java application 50 finishes using object 145, the Java VM can delete the object to free up this memory resource. This latter process is known as garbage collection, and is generally performed by briefly interrupting all threads 71, 72, and scanning the heap 140 for objects which are no longer referenced, and hence can be deleted. The garbage collection of the preferred embodiment is described in more detail below.

The Java VM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later by the interpreter 156.

Another component of the Java VM is the stack area 195, which is used for storing the stacks 196, 198 associated with the execution of different threads on the Java VM. Note that because the system libraries and indeed parts of the Java VM itself are written in Java, and these frequently use multi-threading, the Java VM may be supporting multiple threads even if the user application 50 running on top of the Java VM contains only a single thread itself.

It will be appreciated of course that FIG. 2 is simplified, and essentially shows only those components pertinent to an understanding of the present invention. Thus for example the heap may contain thousands of Java objects in order to run Java application 50, and the Java VM contains many other components (not shown) such as diagnostic facilities, etc.

Figure 3:
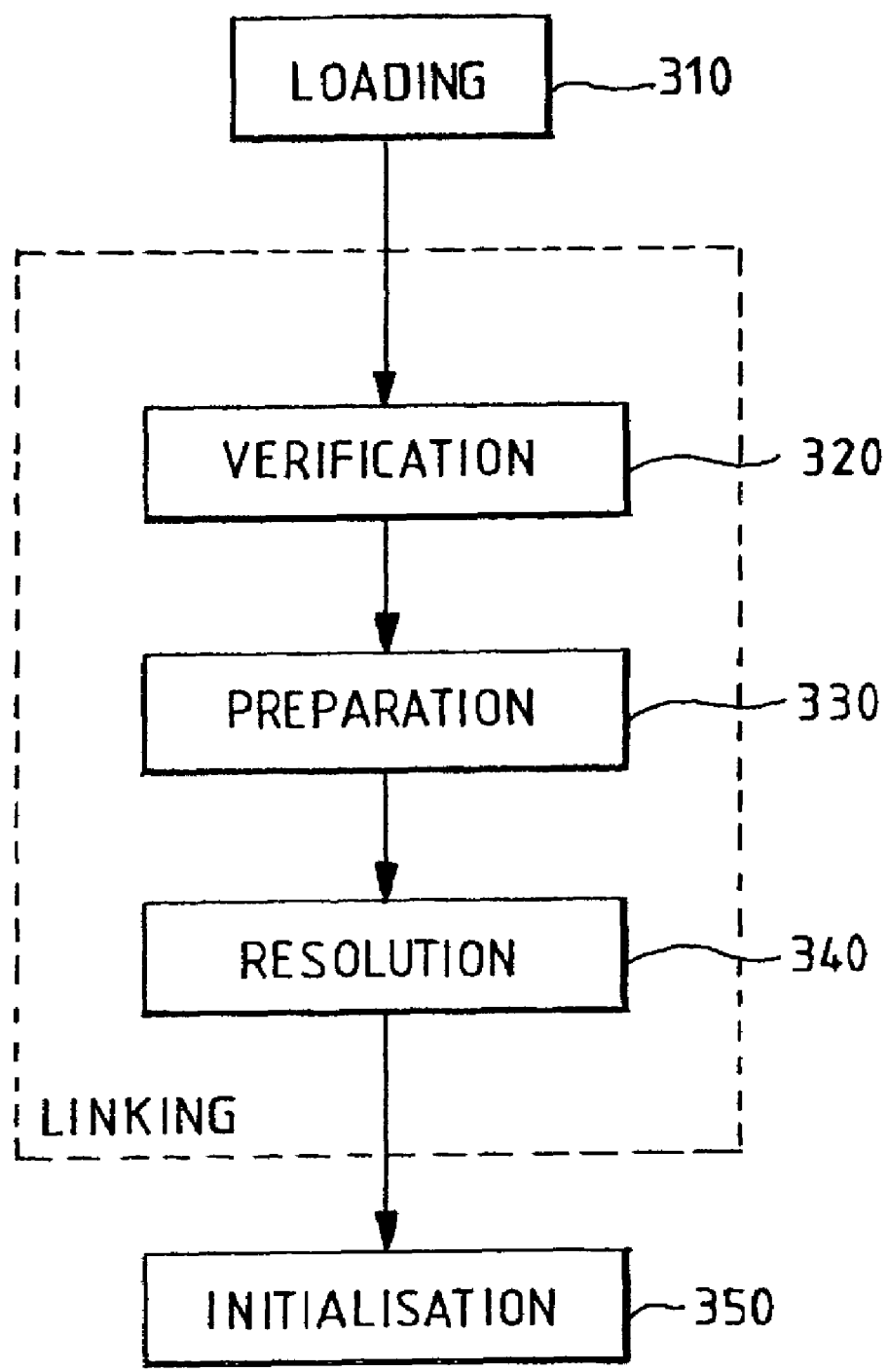
FIG. 3 is a flowchart depicting the steps required to load a class and prepare it for use.

FIG. 3 is a flowchart illustrating the operations conventionally performed to load a class in order to run a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the Java VM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the Java VM implementation how many classes are loaded at this stage, as opposed to waiting until such classes are actually needed before loading them.

The final step in FIG. 3 is the initialisation of a loaded class (step 350), which represents calling the static initialisation method (or methods) of the class. According to the formal Java VM specification, this initialisation must be performed once and only once before the first active use of a class, and includes things such as setting static (class) variables to their initial values (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class object 145 is set as part of the initialisation process, thereby ensuring that the class initialisation is not subsequently re-run.

The end result of the processing of FIG. 3 is that a class has been loaded into a consistent and predictable state, and is now available to interact with other classes. In fact, typically at start up of a Java program and its concomitant Java VM, some 1000 objects are loaded prior to actual running of the Java program itself, these being created from many different classes. This gives some idea of the initial delay and overhead involved in beginning a Java application.

Figure 4:
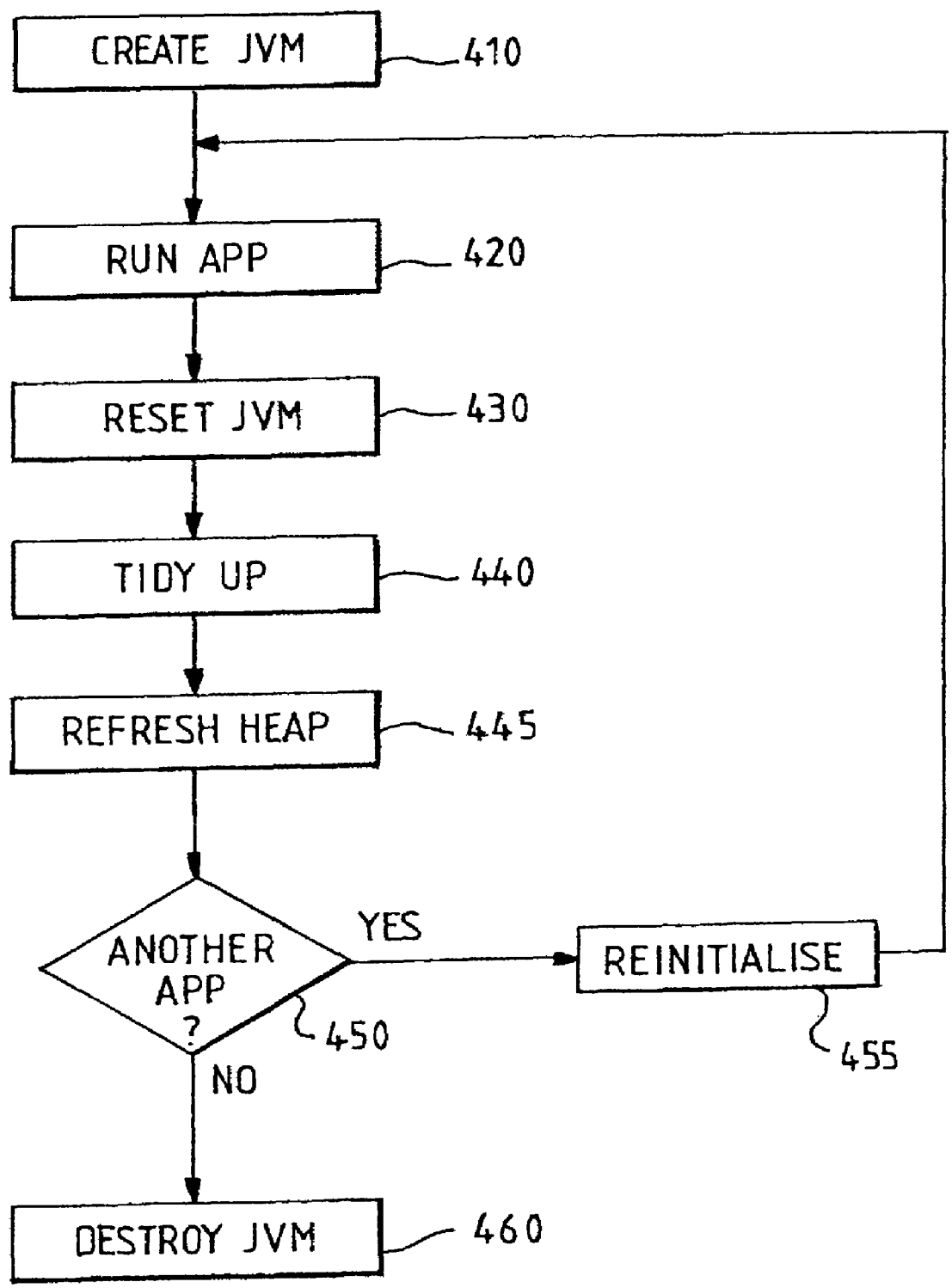
FIG. 4 is a flowchart depicting at a high level the serial reuse of a Java VM.

As mentioned above, the problems caused by this initial delay can be greatly reduced by serial reuse of a Java VM, thereby avoiding the need to reload system classes and so on. FIG. 4 provides a high-level flowchart of a preferred method for achieving such serial reuse. The method commences with the start of the middleware subsystem 45, which in turn uses the Java Native Interface (JNI) to perform a Create JVM operation (step 410). Next an application or transaction to run on the Java VM is loaded by the Application class loader 120. The middleware includes Java routines to provide various services to the application, and these are also loaded at this point, by the Middleware class loader 124.

The application can now be run (step 420), and in due course will finally terminate. At this point, instead of terminating the Java VM as well as the application, the middleware subsystem makes a Reset JVM call to the Java VM (step 430). The middleware classes may optionally include a tidy-up method and/or a reinitialize method. Both of these are static methods. The Java VM responds to the Reset JVM by calling the tidy-up method of the middleware classes (step 440). The purpose of this is to allow the middleware to leave the Java VM in a tidy state, for example removing resources and closing files that are no longer required, and deleting references to the application objects. In particular, all those middleware classes which have been used since the previous Java VM reset (or since the Java VM was created if no resets have occurred) have their tidy-up method called, assuming of course that they have a tidy-up method (there is no requirement for them to have such a tidy-up method).

The tidy-up method may be similar to the finalise method of a class, which is a standard Java facility to allow an object to perform some close-down operation. However, there is an important difference in that tidy-up is a static method. This means that contrary to the finalise method it applies to the class rather than any particular object instance, and so will be called even if there are no current object instances for that class. In addition the timing of the tidy-up method is different from finalise, in that the former is called in response to a predetermined command to reset the Java VM. In contrast, in accordance with the Java VM specification, the finalise method is only triggered by a garbage collection. More particularly, if an object with a finalizer method is found to be unreachable during a garbage collection (i.e. it is no longer effectively active) then it is queued to the finalizer thread, which then runs the finalizer method after the garbage collection is completed. Note that the finalizer method of an object may never be called, if an application finishes and the Java VM shuts down without the system needing to perform a garbage collection.

Once the tidy-up has been completed, a refresh heap operation is performed (step 445). As will be described in more detail below, this deletes those portions of the heap that relate to the application or transaction that has just been completed, generally analogous to a garbage collection cycle. Note that many of the objects deleted here might not have been removable prior to the tidy-up method, since they could still have been referenced by the middleware classes.

At this point, the middleware subsystem makes a determination of whether or not there is another application to run on the Java VM (step 450). If not, the middleware subsystem uses the JNI to make a Destroy JVM call (step 460) which terminates the Java VM, thereby ending the method of FIG. 4. If on the other hand there is another application to run, then this new application is started by the middleware. The system responds to this new application by calling in due course the reinitialisation method in each of the middleware classes to be reused (step 455). The purpose of this is to allow the middleware classes to perform certain operations which they might do at initialisation, thereby sidestepping the restriction that the Java VM specification prevents the initialisation method itself being called more than once. As a simple example, the reinitialisation may be used to reset a clock or a counter. As shown in FIG. 4, the system is now in a position to loop round and run another application (step 420).

It is generally expected that the reinitialisation method will be similar in function to the initialisation method, but there may well be some differences. For example, it may be desired to reset static variables which were initialised implicitly. Another possibility is to allow some state or resources to persist between applications; for example, if a class always outputs to one particular log file which is set up by the initialisation method, it may be more efficient to keep this open in between successive Java VMs, transparent to the application.

It should be noted that whilst FIG. 4 indicates the distinct logical steps performed by the method of the invention, in practice these steps are not all independent. For example, calling the tidy-up methods (step 440) is part of the overall Reset JVM operation (step 430). Likewise, calling the reinitialisation methods (step 455) is effectively part of the start-up processing of running the new application (step 420). Thus reinitialisation is performed prior to first active use of a class, and this may occur at any stage of a program. Therefore class reinitialisation (like conventional initialisation) is not necessarily completed at start-up of the program, but rather can be regarded as potentially an ongoing process throughout the running of a program.

It will also be appreciated that there is some flexibility with regard to the ordering of the steps shown in FIG. 4. In particular, the decision of whether or not there is to be another application (step 450) could be performed earlier, such as prior to the refresh heap step, the tidyup step, and/or the Reset JVM step. In the latter case, which corresponds to immediately after the first application has concluded (i.e. straight after step 420), the alternative outcomes would be to destroy the Java VM (step 460) if there were no further applications, or else to reset the JVM, tidy up, refresh the heap, and reinitialise (steps 430, 440, 445, and 455) if there were further applications. If instead the decision step 450 is intermediate these above two extreme positions, the logic flow can be determined accordingly.

It should be noted that in the preferred embodiment, the ability to reset the Java VM, and to have tidyup and reinitialise methods, is only available for middleware classes (i.e. those loaded by the middleware class loader). This is to allow the middleware classes to be re-used by successive applications or transactions, for which they can perform various services. The basis for this approach is that typically the middleware is a relatively sophisticated and trusted application, and so can be allowed to take responsibility for proper implementation of the tidy-up and reinitialise methods. On the other hand, individual transactions are not treated as reliable.

Note also that the system classes themselves do not have tidyup or reinitialisation methods, despite persisting across a Java VM reset. Rather, if the middleware makes any change to a system class, then the middleware itself is expected to take the necessary action (if any) for a reset with respect to the system class as part of the middleware's own tidyup operation.

An important part of the Reset JVM/tidyup operation (steps 430 and 440) in the preferred embodiment is to make sure that the Java VM is in a state which is amenable to being tidied up. If this is the case, the Java VM is regarded as being clean, if not, it is regarded as being dirty or unresettable.

Considering this in more detail, if the application has performed certain operations, then it will not be possible for the middleware classes to be certain that their tidy-up and reinitialise methods will fully reset the system to a fresh state. With such a contaminated Java VM, the system still calls the tidy-up methods of the class objects as per normal (step 440), but the return code back to the middleware associated with the reset JVM operation (step 430) effectively indicates failure. The expectation here is that the Java VM would actually be terminated by the middleware subsystem at this point, as it is no longer in a predictable condition.

One important situation which would prevent the Java VM from being able to properly reset is where the application has performed certain operations directly such as making security or environment changes, loading native code, or performing Abstract Windowing Toolkit (AWT) operations. These affect the state of the Java VM or the underlying computer system and cannot be reliably tidied up by the middleware, for the simple reason that the middleware does not necessarily know about them. Such changes could then persist through a Reset JVM call, and contaminate the Java VM for any future applications. In contrast, if an application performs such operations through a middleware call, then this does not cause any problems, because the middleware now does know about the situation and so can perform whatever tidyup measures are required.

The Java VM thus monitors for operations that may prevent proper reset, including whether they have been performed by an application or middleware. This is determined by the Java VM keeping track of its context, which is set to application context for an application class, and to middleware context for a middleware class, whilst a primordial or extension class has no impact on the existing context of application or middleware. In particular, context can be determined based on the type of class which contains the method that is currently being performed, whilst the type of class is determined from its original class loader.

As previously mentioned, the list of problematic operations given above only causes difficulty when performed in an application context, since in a middleware context it is possible for them to be reset by the appropriate tidy-up routines of the relevant middleware classes.

Figure 5:
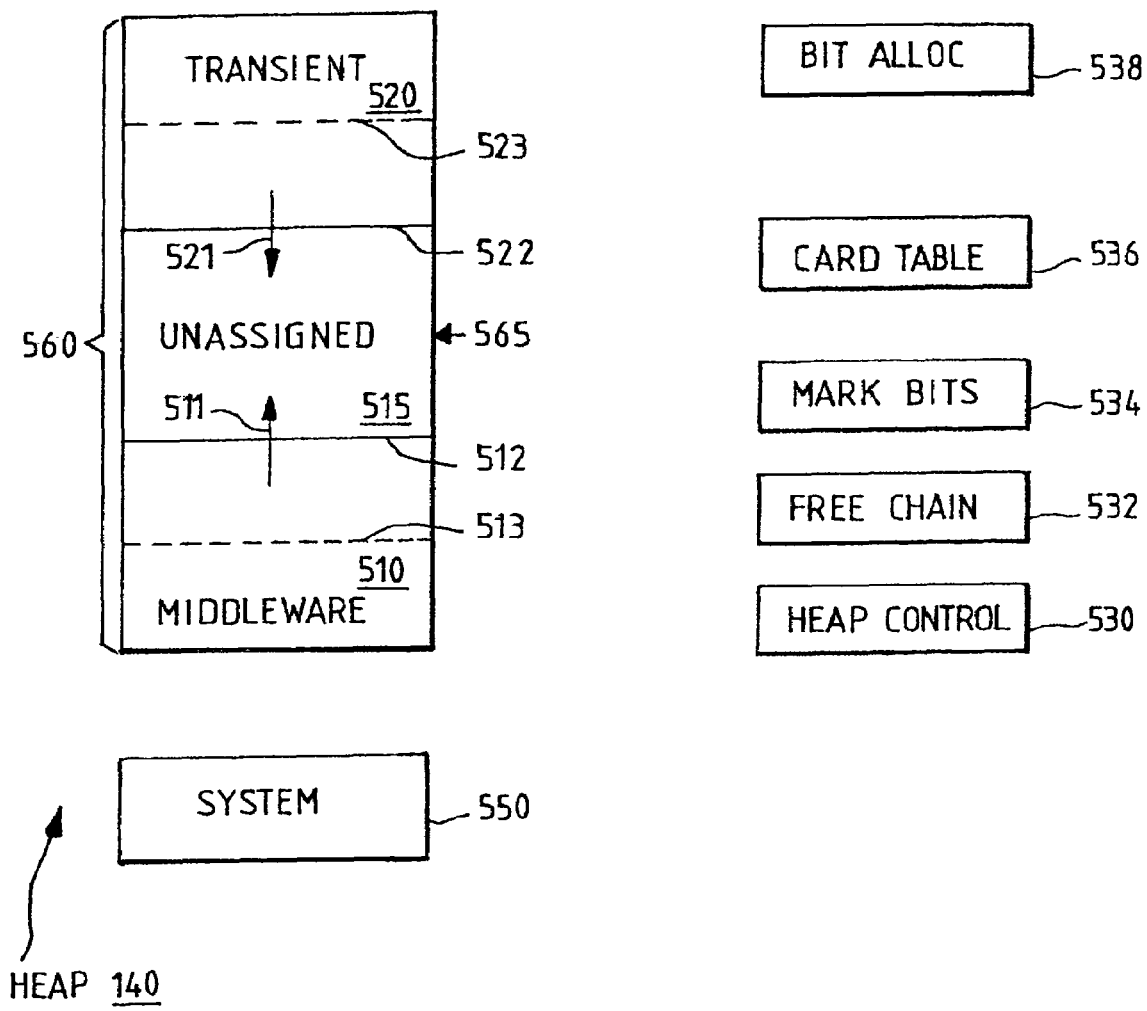
FIG. 5 is a schematic diagram showing the heap and its associated components in more detail.

Referring now to FIG. 5, in the preferred embodiment the heap 140 is split into three components. Objects in one component can reference objects in another component. At the bottom (logically) of heap 140 is middleware section 510, and at the top of the heap is transient section 520. The data in these two heaps grows towards each other, thus transient heap grows in the direction of arrow 521, and middleware heap in the direction of arrow 511. The middleware heap is defined by boundary 512, and the transient heap by boundary 522, with unassigned space 515 between them. It should be appreciated that boundaries 512 and 522 represent the maximum size currently assigned to the two heaps, rather than their current fill levels—these are instead shown by dashed lines 513 and 523. In other words, as the middleware heap fills up, the fill level 513 will approach towards middleware heap boundary 512; likewise as the transient heap fills up, the fill level 523 will approach towards transient heap boundary 522.

Finally, and separate from the transient heap and middleware heap, is system heap 550. Note that the combined transient and middleware heaps, together with intervening unassigned space, are allocated from a single physically contiguous block of memory 560. In contrast, the system heap 550 may be formed from multiple non-contiguous regions of memory.

In one preferred embodiment, memory 560 comprises 64 MBytes, and the initial size of the middleware and transient heaps is 0.5 Mbyte each. Thus it can be seen that initially the unassigned region 515 dominates, although the transient and middleware heaps are allowed to expand into this space (details of the expansion policy are provided in the above mentioned GB 0027045.4 application, although these have no direct relevance to the present invention). However, the values quoted are exemplary only, and suitable values will vary widely according to machine architecture and size, and also the type of application.

Heap control block 530 is used for storing various information about the heap, such as the location of the heap within memory, and the limits of the transient and middleware sections as defined by limits 512 and 522. Free chain block 532 is used for listing available storage locations within the middleware and transient sections (there is actually one free chain block for each section). Thus although the middleware and transient heaps start to fill sequentially, the likely result of a garbage collection cycle is that space may become available within a previously occupied region. Typically therefore there is no single fill line such as 513, 523 between vacant and occupied space, rather a fragmented pattern. The free chain block is a linked list which specifies the location and size of empty regions within that section of the heap. It is quick to determine whether and where a requested amount of storage is available in the heap by simply scanning through the linked list. Note that in the preferred embodiment, empty regions in the heap which are below a predetermined size (typically a few hundred bytes) are excluded from the free chain list. This prevents the list from becoming too long through containing a large number of very small vacant regions, although it does mean that these regions effectively become inaccessible for storage (although they can be retrieved later, as described in more detail below).

The transient heap 520 is used for storing objects having no expected currency beyond the end of the application or transaction, including application object instances, and primordial object instances and arrays created by application methods (arrays can be regarded as a specialised form of object). Since the lifetime of such objects is commensurate with the application itself, it should be possible to delete all the objects in the transient heap at the end of the application. The application class objects are also on the transient heap. In contrast, the middleware heap 510 is used for storing objects which have a life expectancy longer than a single transaction, including middleware object instances, and primordial object instances and arrays created by middleware methods. In addition, string objects and arrays for strings interned in the Interned String Table are also stored in the middleware heap (the Interned String Table is a tool whereby if multiple identical strings are to be stored on the heap, it is possible to store only one copy of the string itself, which can then be referenced elsewhere). Lastly, the system heap 550 is used for storing primordial class objects and reusable class objects, where the term reusable class object is used to denote a class which can be used again after JVM reset.

The type of class is dependent on the class loader which originally loaded it, in other words a middleware class and an application class are loaded by the middleware class loader 124 and the application class loader 120 respectively. For the purposes of the present discussion, primordial classes can be considered as classes loaded by the Primordial or Extensions class loader (130 and 125 respectively in FIG. 2). In the preferred embodiment, classes loaded by the middleware class loader are automatically regarded as reusable.

Instances of primordial classes, such as the basic string class java/lang/String, can be located either in the middleware heap or the transient heap, depending on the method which created them. In a preferred embodiment of the present invention, the determination of where to place such primordial class instances is based on the current context described above (also referred to as method-type). Thus if a method belonging to an application class is invoked, the context or method-type becomes Application, whilst if a method belonging to a middleware class is invoked, the method-type becomes Middleware. Finally, if a method belonging to a primordial class is invoked, the method-type is unchanged from its previous value. The context or method-type is stored in the Java frame for the method (which is stored on stack 195—see FIG. 2); at the completion of the method, the method-type reverts to its value at the time the method was invoked, which was stored in the previous frame.

It should be noted that for the above purpose a method belongs to the class that actually defines it. For example, if class A subclasses class B, but does not override method C, then method C belongs to class B. Therefore the method-type is that of class B, even if method C is being run for an instance of class A. In addition, the reason for tracking method-type on a per-thread basis is that it is possible for various threads within an application to be executing different methods having different context.

The transient region of the heap, containing objects created by the application or transaction, is subject to normal garbage collection. However, the intention is that it will be sufficiently large that this is unlikely to occur within the lifetime of a typical application, since as previously mentioned garbage collection is a relatively slow operation. At the end of each application, the transient region of the heap is reset. (The repetition of this pattern will thereby avoid having to perform garbage collection during most applications). In contrast the middleware region generally contains objects created by the trusted middleware. It is again subject to conventional garbage collection, although in a transaction environment it is expected that the majority of objects will be created in the transient heap, so that garbage collection is not expected to occur frequently. The middleware heap is not cleared between applications, but rather remains to give the middleware access to its persistent state (it is assumed that the middleware can take responsibility for resetting itself to the correct state to run the next application).

The preferred embodiment is actually somewhat more complicated than described above, in that it supports two types of application class loader, one of which is for standard application classes, the other for reusable application classes. The motivation here is that when the next transaction is to run, it will in fact require many of the same application classes as the previous transaction. Therefore it is desirable to retain some application classes rather than having to reload them, although certain additional processing is required to make them look newly loaded to the next transaction. Conversely it would be possible to have a second middleware class loader which is for non-reusable middleware classes. In the former situation the reusable application classes are treated essentially in the same manner as the reusable middleware classes, (eg loaded into the system heap); in the latter situation the non-reusable middleware classes would be treated similarly to the non-reusable application classes, but loaded into the middleware heap (since they may exist after the conclusion of a transaction, even if they do not endure for the next transaction). However, for present purposes in order to explain the invention more clearly, it will be assumed that all the middleware classes are reusable, and that none of the application classes are reusable.

Figure 6A:
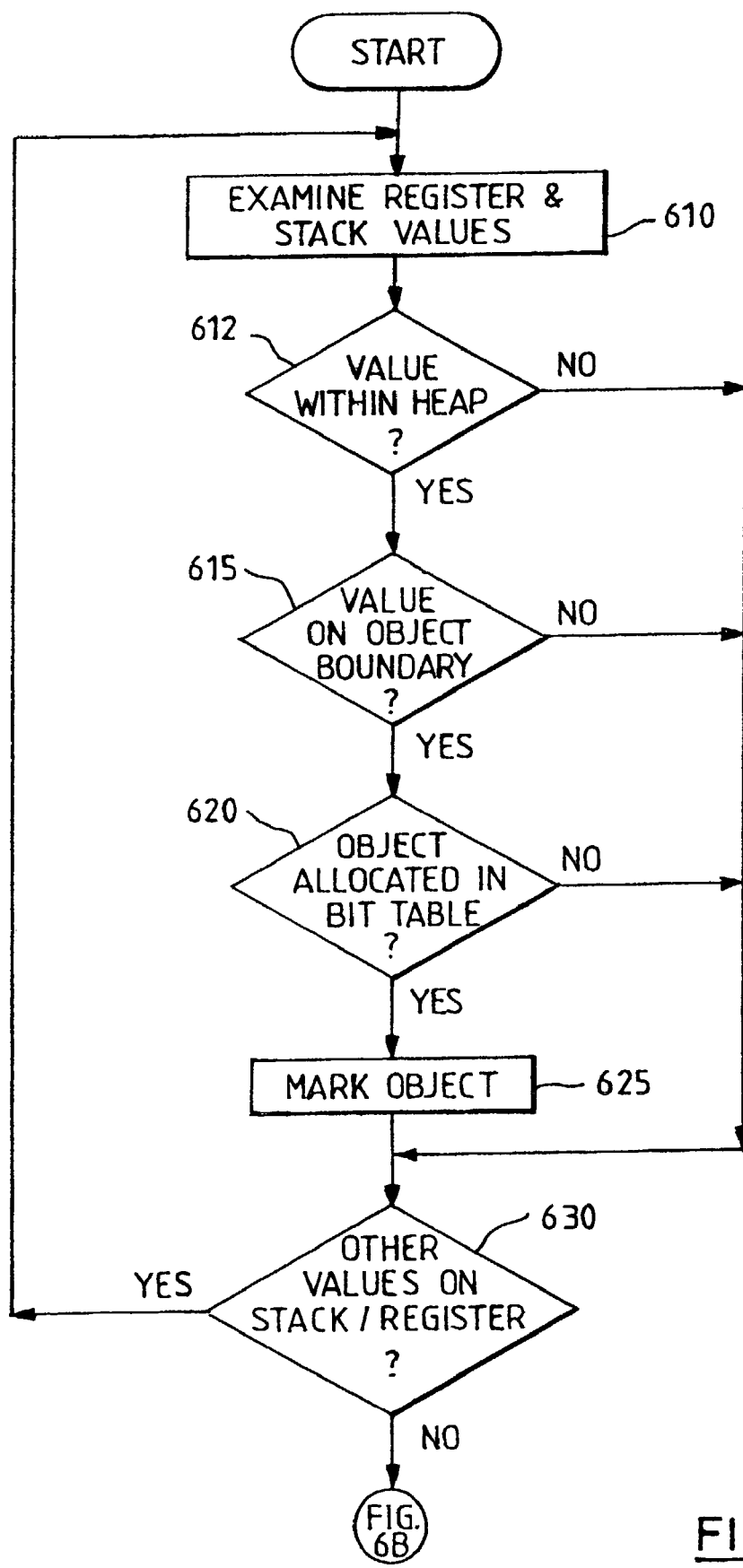
FIGS. 6A and 6B form a flowchart illustrating garbage collection.
Figure 6B:
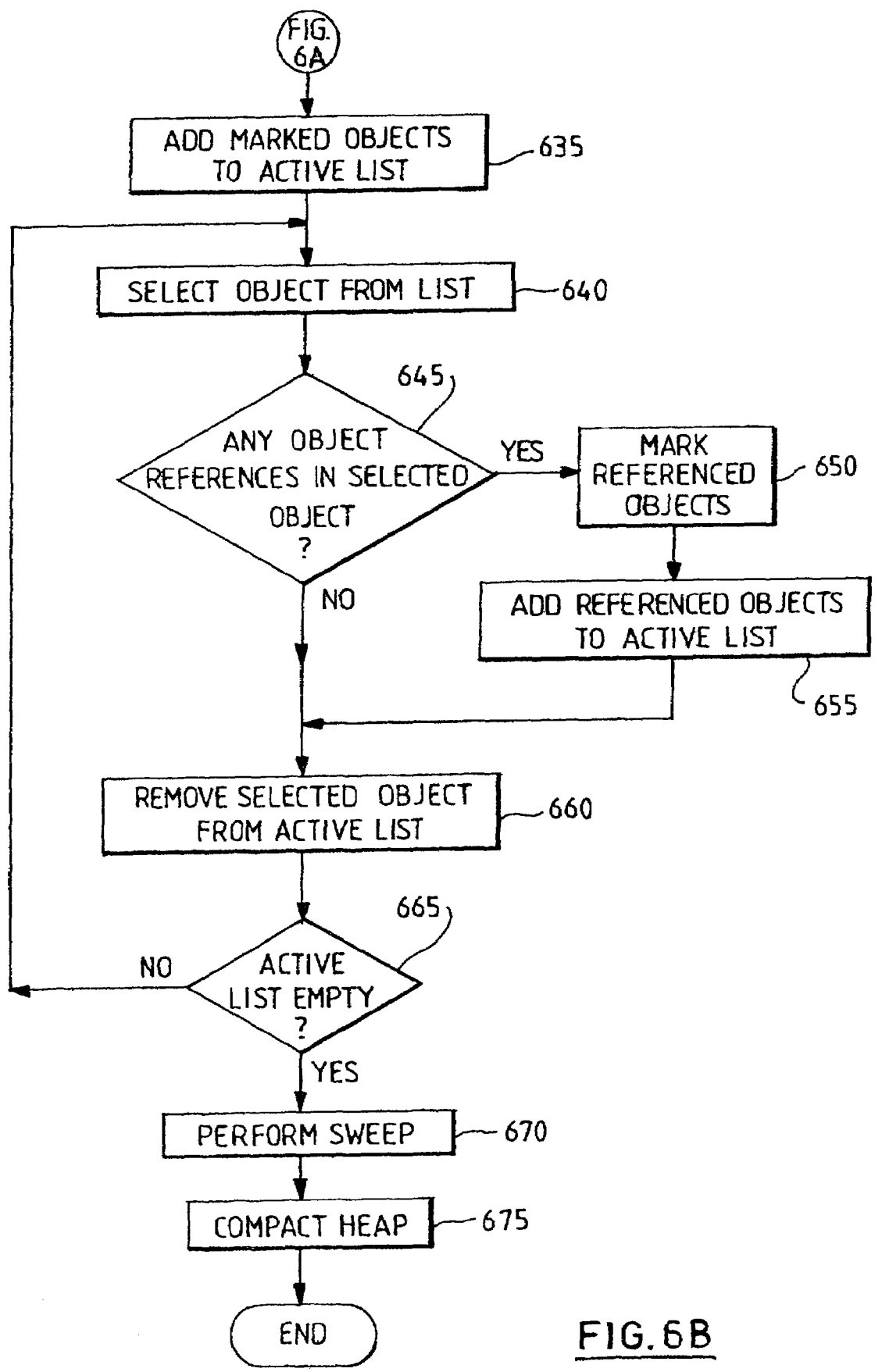

Referring now to FIGS. 6A and 6B, these illustrate the garbage collection strategy of the preferred embodiment. In particular, the method involves firstly a mark phase, which marks all objects in the heap that are currently in use (known as live or active objects), and secondly a sweep phase, which represents the actual deletion of objects from the heap. Note that general background on garbage collection algorithms can be found in "Garbage Collection: Algorithms for Automatic Dynamic Memory Management" by R Jones and R Lins, Wiley, 1996 (ISBN 0 471 94148 4), whilst one implementation for garbage collection in a system having multiple heaps is described in: "A customisable memory management framework for C++" by G Attardi, T Flagella, and P Iglio, in Software Practice and Experience, vol 28/11, 1998.

As shown in FIG. 6A, the method starts with a review of the registers and stack, both the Java stack, as shown in FIG. 2, and also the C stack, (assuming that the Java VM 40 is running as a C application on OS 30, see FIG. 1) (step 610). Each thirty-two bit data word (for a 32-bit system) contained therein could represent anything, for example a real number, or part of a string, but it is assumed at least initially that it may denote a 32 bit reference to an object location in the heap. To firm up on this assumption, three tests are made. Firstly, it is tested whether or not the number references a location within the heap (step 612); if not then the number cannot represent an object reference. Secondly, in the preferred embodiment, all objects commence on an 8-byte boundary. Thus if the location corresponding to the data word from the stack/register does not fall on an object boundary (tested at step 615), then the original assumption that the data/number represents a reference to the heap must again be rejected. Thirdly, in the preferred embodiment, a table 538 is maintained (see FIG. 5) which has a bit for each object location in the heap; this bit is set to unity if there is an object stored at that location, and zero if no object is stored at that location (the relevant bit is updated appropriately whenever an object is created, deleted, or moved). If the data word from the stack/register corresponds to an object location for which the bit is zero, in other words, no object at that location, then once more the original assumption that the data/number represents a reference to the heap must be rejected (step 620). If the data word passes all three of the tests of steps 612, 615 and 620, then there are three remaining possibilities: (a) the word references an object on the heap; (b) the word is an integer that happens to have the same value as the object reference; or (c) the word is a previous value from uninitialized storage. As a conservative measure, it is assumed that option (a) is correct, and so the object is marked as live (step 625). A special array of bits is provided (block 534, see FIG. 5), one bit per object, in order to store these mark bits. If there remain other values on the stacks/registers to test (step 630), the method then loops back to examine these in the same manner as just described; if not the first stage of the mark process is complete. The objects so far identified are known as "roots", in the sense that any other objects which are still live must be referenced directly or indirectly from one of these objects.

In the second stage of the mark process, shown in FIG. 6B, the objects marked as live (i.e. the roots) are copied onto a list of active objects (step 635) (in the preferred embodiment objects are actually copied to the active list when originally marked, i.e. at the same time as step 625 in FIG. 6A). An object from this list is then selected (step 640), and examined to see if it contains any references (step 645). Note that this is a reasonably straightforward procedure, because the structure of the object is known from its corresponding class file, which defines the relevant variables to be used by the object. Any objects referenced by the selected object are themselves marked (step 650) and added to the active list (step 655). Next, the selected object is removed from the active list (step 660), and then a test is performed (step 665) to determine if the active list is empty; if not, processing loops back to step 640 to select another object from the active list. Finally, when step 665 produces a positive outcome, all objects that are active, because they are referenced directly or indirectly from the stacks or registers, have been appropriately marked.

The mark stage is then followed by a sweep stage (step 670) and a compact stage (step 675). The former garbage collects (i.e. deletes) all those objects which have not been marked, on the basis that they are no longer reachable from any live or active object. In particular, each object which is not marked as active has its corresponding bit set to zero in table 538 (see FIG. 5). Runs of zeros in the bit allocation table 538 are now identified; these correspond to some combination of the object immediately preceding the run, which may extend into the run (since only the head of an object is marked in the bit allocation table), and free space (released or never filled). The amount of free space in the run of zeros can be determined by examining the size of the object immediately preceding the run. If the amount of free space exceeds the predetermined minimum amount mentioned earlier, then the run is added to the free chain list 532 (see FIG. 5).

Over time, such sweeping will tend to produce many discontinuous vacant regions within the heap, corresponding to the pattern of deleted objects. This does not represent a particularly efficient configuration, and in addition there will be effective loss of those pieces of memory too small to be on the free list. Hence a compact stage (step 675) can be performed, which acts to squeeze together those objects which remain in the heap after the sweep in order to amass them into a single continuous block of storage (one for the transient heap, one for the middleware heap). Essentially, this means relocating objects from their initial positions in the heap, to a new position so that, as much as possible, they are all adjacent to one another. As part of this compaction, the very small regions of memory too small to be on the free chain 532 (see FIG. 5) should be aggregated into larger blocks that can be recorded in the free chain.

An important requirement of the object relocation of the compaction step is of course that references to a moved object are altered to point to its new location. This is a relatively straightforward operation for object references on the heap itself, since as previously mentioned, they can be identified from the known structure of each object, and updated to the appropriate new value. However, there is a problem with objects which are directly referenced from a register or stack. As discussed above, each number in the register/stack is treated for garbage collection purposes as if it were an object reference, but there is no certainty that this is actually the case; rather the number may represent an integer, a real number, or any other piece of data. It is therefore not possible to update any object references on the stack or register, because they may not in fact be an object reference, but rather some other piece of program data, which cannot of course be changed arbitrarily. The consequence of this is that it is impossible to move an object which appears to be directly referenced from the heap or stack; instead these objects must remain in their existing position. Such objects are informally known as "dozed" objects since they cannot be moved from their current position.

Two other classes of objects which cannot be moved from the heap are class objects, and thread objects (thread objects are control blocks used to store information about a thread). The reason for this is that such objects are referenced from so many other places in the system that it is not feasible to change all these other references. These objects are therefore known as "pinned", since like dozed objects they cannot be moved from their current position.

A consequence of pinned and dozed objects is that a compact process may not be able to accumulate all objects in a heap into a single contiguous region of storage, in that pinned and dozed objects must remain in their original positions.

Note that in the preferred embodiment, a compact stage (step 675) is not necessarily employed on every garbage collection cycle, unless this is explicitly requested as a user initial set-up option. Rather a compact operation is only performed when certain predetermined criteria are met. For example, as previously indicated a garbage collection can be triggered by a request for storage in the heap that cannot be satisfied. If the request still cannot be satisfied after the sweep step 670, because there is no single block of memory available of sufficient size, then a compact stage is automatically performed, to try and accumulate an adequately-sized storage region.

An important aspect of the garbage collection process is that it operates by detecting all live objects; the remaining objects which are not live are then marked as dead. Consequently, for a given object, it is not possible to tell whether or not it is dead without effectively performing a full garbage collection.

One complication that arises from effectively having multiple heaps of potentially variable sizes is that it becomes more complex to determine whether or not a given object reference is within a heap (as required, for example, for step 612 of FIG. 6A), and if so which one (in case, for example, they have different garbage collection policies). One possibility is to compare the reference with the information in the heap control block 530 (see FIG. 5). However, with multiple heaps, and also a system heap which is not necessarily contiguous, this becomes a time-consuming operation.

Figure 7:
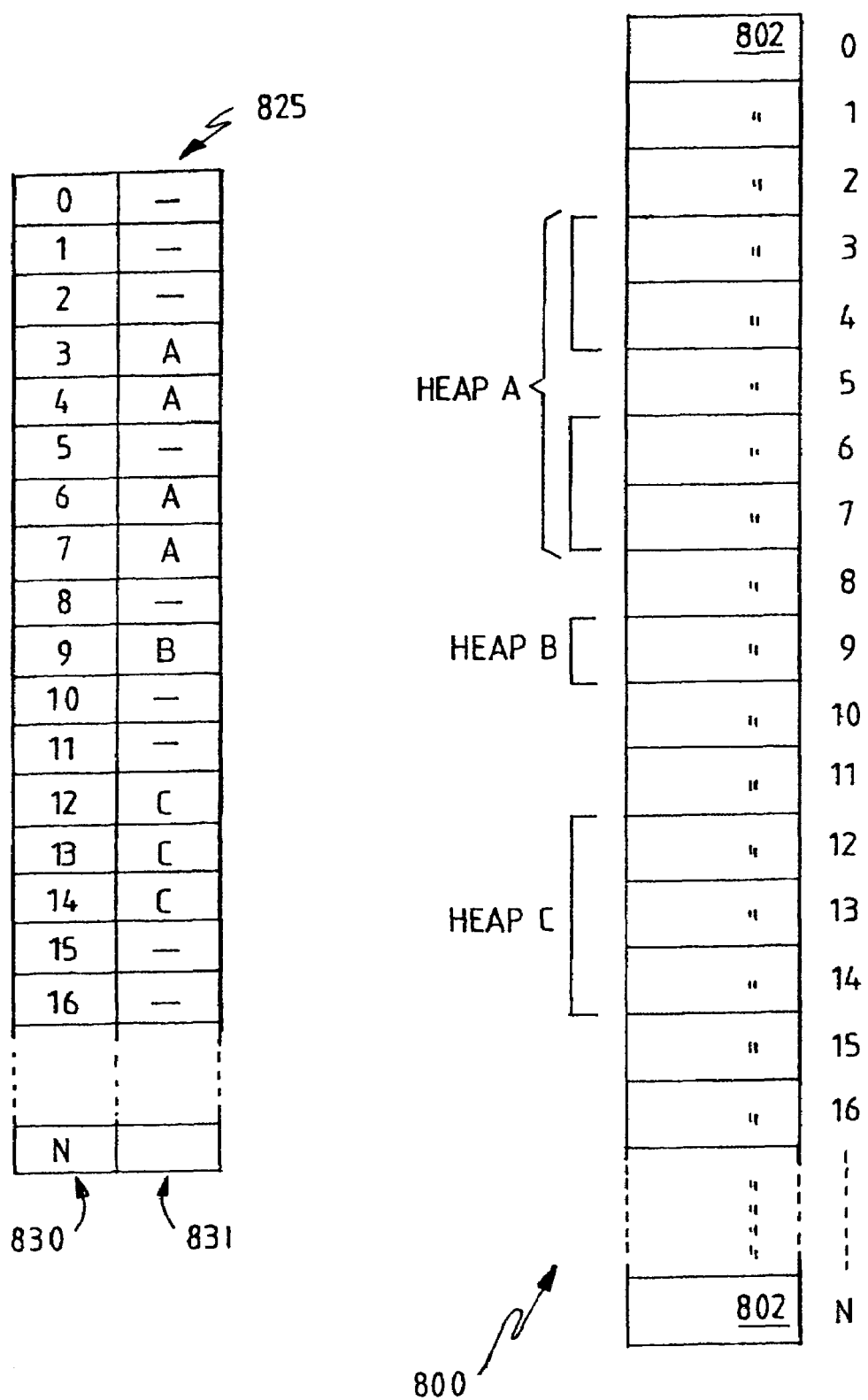
FIG. 7 is a diagram of a lookup table used to determine if a reference is in a heap.

In order to overcome this problem, the preferred embodiment adopts the approach illustrated schematically in FIG. 7. As shown, system address space or virtual memory 800 is split into chunks of a standard size, referred to herein as slices 802. As previously mentioned, in the preferred embodiment on a 32 bit system, these slices are each 64 KBytes in size. The slices can be numbered linearly as shown with increasing address space. The heaps can then be allocated out of these slices, in such a way that heap space is always allocated or deallocated in terms of an integral number of slices. FIG. 7 shows three different heaps (for simplicity termed A , B and C), whereby heap A is non-contiguous and comprises slices 3-4 and 6-7, heap B comprises slice 9, and heap C is contiguous and comprises slices 12-14 inclusive. Note that two or more of these heaps may possibly be being managed as single block of storage (i.e. in the same manner as the transient and middleware heaps of FIG. 5).

Also illustrated in FIG. 7 is lookup table 825, which has two columns, the first 830 representing slice number, and the second 831 representing heap number. Thus each row of the table can be used to determine, for the relevant slice, which heap it is in—a value of zero (indicated by a dash) is assumed to indicate that the slice is not currently in a heap. The system updates table 825 whenever slices are allocated to or deallocated from the heap.

Using table 825 it now becomes very quick to determine whether a given memory address is in a heap. Thus an initial determination is made of the relevant slice, by dividing the given memory location (minus the system base memory location if non-zero) by the slice size, and rounding down to the next integer (i.e. truncating) to obtain the slice number. This can then be used to directly access the corresponding heap identifier in column 831. In fact, it will be appreciated that column 830 of Table 825 does not need to be stored explicitly, since the memory location of each entry in column 831 is simply a linear function of slice number. More specifically, each entry in column 831 can typically be represented by 1 byte, and so the information for slice N can be found at the base location for table 825, plus N bytes. Overall therefore, this approach provides a rapid mapping from object location to heap identity (if any), irrespective of the number of heaps, or the complexity of their configuration.

Figure 8:
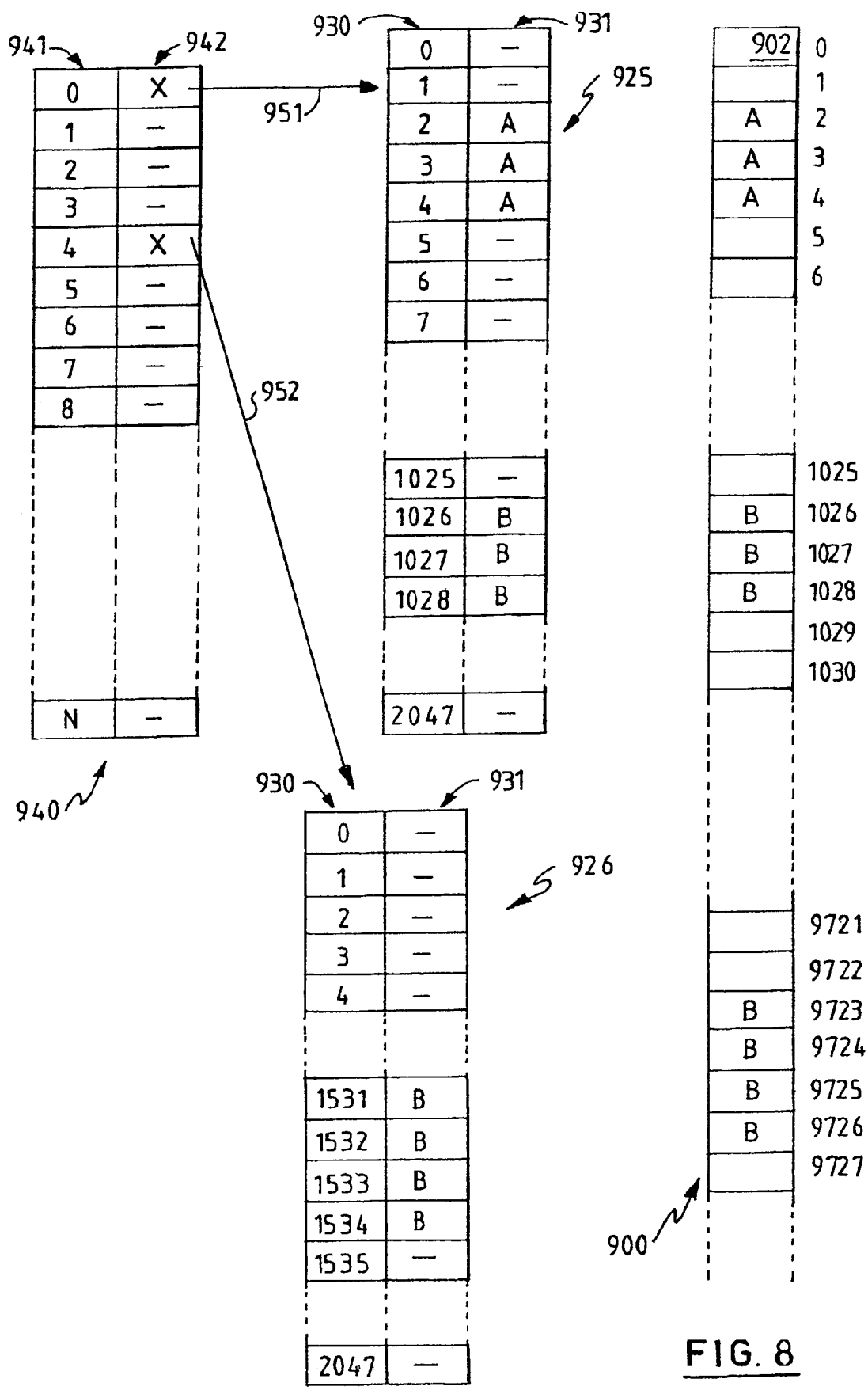
FIG. 8 is a diagram of a modified lookup structure for the same purpose as FIG. 7, but for use in a system with much larger memory.

One problem however with the technique illustrated in FIG. 7 is that on 64 bit machines, the virtual memory or address space is so great that table 825 would become prohibitively large. Thus in a preferred embodiment for such systems, a modified mapping is used, as shown in FIG. 8, which has an extra layer in the memory mapping arrangement. In the diagram, memory 900 represents the system address space or virtual memory, which as in FIG. 7 is divided into slices 902 (the difference from FIG. 7 being that on a 64 bit system, address space is much larger, so there are many more slices). FIG. 8 illustrates the location of two heaps, arbitrarily denoted A and B, with A comprising slices 2-4 inclusive, and B comprising slices 1026-1028 inclusive and also slices 9723-9726 inclusive.

Also shown in FIG. 8 are two lookup tables, 925, 926, each of which, for the sake of illustration, contains 2048 entries, and maps to a corresponding range of slices in address space 900. Lookup table 925 maps slices 0-2047, whilst lookup table 926 maps slices 8192-10239. These lookup tables are directly analogous to that of FIG. 7, in that they logically contain two columns, the first 930 identifying a slice number, and the second 931 the identity of any heap within that slice (or else zero). Tables 925 and 926 can be regarded as forming the lower level of the lookup hierarchy.

FIG. 8 also depicts a higher layer in the lookup hierarchy, namely table 940, which again logically contains two columns. The first column 941 logically represents the number of lookup table 925, 926 in the next lower layer of the lookup hierarchy, whilst the second column 942 contains a pointer to the relevant lookup table. Thus the first row of column 942 contains a pointer 951 to table 925, and the fifth row of column 942 contains a pointer 952 to table 926.

It will be noted that to conserve space, lookup tables in the lower level of the hierarchy only exist where at least some of the corresponding slices are assigned to a heap. Thus for the particular arrangement of FIG. 8, the lookup tables for slices 2048-4095, 4096-6143, and 6144-8191 have not been created, since none of these slices has been assigned to any heap. In other words, lookup tables 925, 926, etc for various slice ranges will be created and deleted according to whether any slices within that slice range are being utilised for the heap. If this is not the case, and the lookup table is deleted (or not created in the first place), the pointer in column 942 of top level lookup table 940 is set to zero.

The operation of the embodiment shown in FIG. 8 is analogous to that of FIG. 7, except that there is an extra level of indirection involved in the hierarchy. Thus to determine whether a particular reference or address is within a heap, the correct row is determined based on a knowledge of the size of a slice 902, and also the number of rows in each lower level lookup table 925, 926. It is expected that for most rows, the corresponding entry in column 942 will be null or zero, immediately indicating that that address is not in a heap slice. However, if the lookup selects a row which has a non-zero entry, this is then followed (using pointer 951, 952 or equivalent) to the corresponding lookup table. The desired entry is then found by locating the row using the reference under investigation (allowing for which particular lookup table is involved), and examining the entry for that row in column 931. This will indicate directly whether or not the slice containing the referenced location is in a heap, and if so, which one.

As an example of this, to investigate memory address 637405384 we first integer divide by 65536 (the size of a slice in the preferred embodiment), to give 9727 (truncated), implying we are in slice 9727. Next we perform an integer division of 9727 by 2048 (the number of entries in each lower level look-up table), to give 4 (truncated), implying we are in the 5th row of column 941. It will be appreciated that we could have got here directly by dividing 637405384 by 134217728 (which equals 2048×65536, or in other words, the total number of addresses per lower level lookup table). In any event, from the 5th row of table 940, it is determined that the corresponding entry in column 941 is non-zero, so that the specified address may possibly lie in a heap. Accordingly, pointer 952 is followed to table 926. Here we can determine that the row of interest is number 1535 (equal to 9727 modulo 2048), from which we can see that this particular slice is not, after all, part of heap. It follows of course that this is also true for any address within this slice.

Returning now to FIG. 4, as previously described, at the end of a transaction the transient heap is deleted (equivalent to the refresh heap step 445, performed as part of the Reset JVM). This activity is generally similar to garbage collection, although certain optimizations are possible, and certain additional constraints need to be considered. This process is shown in more detail in the flow chart of FIG. 9 (which is split for convenience into two components, 9A and 9B). The first step in FIG. 9A (1005) is to wait for all finalization activity to complete. Thus if there has been a GC during a transaction then there may be finalizers to be run and they must be run before the transient heap can be reset, as the finalizers could create (or require) other objects. This checking is performed by confirming that there are no objects waiting for the finalizer thread, and that there are no other in-progress objects (i.e. the processing of all pending finalization objects has been completed). Next all the locks required for garbage collection are obtained, and all other threads are suspended (step 1010). The system is now in a position to commence deletion of the transient heap.

In order to accomplish this, the stacks and registers of all threads are scanned (as for a normal garbage collection). Any potential references to the transient heap can be found, for example using the approach described in relation to FIG. 7 or 8 (step 1015). Should such a reference to the transient heap be located, then the Java VM is potentially dirty and so cannot be reset. The reason for this as discussed in relation to standard garbage collection (FIG. 6) is that the references on the stacks and registers must be treated as live, even though it is not certain that they are in fact object references. To firm up on this the references are tested to see if it is possible to exclude them from being object references (step 1020), essentially by using the same three tests 612, 615 and 620 of FIG. 6. In other words, if the possible reference is not on the heap, or does not fall on an 8-byte boundary, or does not correspond to an allocated memory location, then it cannot in fact be a reference. Otherwise, the register or stack value may still be a reference, and so processing has to exit with an error that the Java VM is dirty and cannot be reset (step 1099). Note that references from the stacks or registers to the middleware or system heap are of course acceptable, because objects on these heaps are not being deleted.

It will be appreciated that based on the above, a spurious data value in a stack or register will sometimes prevent Java VM reset. However this happens relatively infrequently in practice, because all but the main application thread and certain system threads should have terminated at this point, so the stacks are relatively empty (n.b. the policy adopted in the preferred embodiment is that a Java VM cannot be reset if more than a single transaction thread was used; multiple middleware threads are tolerated providing they have terminated by the completion of the middleware tidyups). Related to this, finalizer objects on the transient heap are retained in that heap until a Java VM reset. This means that references to such objects are not entered onto the stack for the finalizer thread, which would otherwise typically cause the reset to fail at steps 1015 and 1020 (this would be the case even where the finalise method for the object had been finished, since this would not necessarily lead to complete deletion of the corresponding stack entry; rather the finalizer thread may enter a function to wait for more work, resulting in uninitialized areas on the stack which may point to previously processed finalizer objects).

It is important to note that error 1099 indicating that the Java VM is dirty does not imply that previous processing was incorrect, merely that the Java VM cannot be reset (although of course this may in turn indicate some unexpected action by the application). In other words, a new Java VM will need to be created for the next application. Because of this, if it is detected that the Java VM is dirty, such as a negative outcome at step 1020, the method normally proceeds immediately to step 1099. This returns an error code to the Reset JVM request from the middleware, with no attempt to continue to perform any further garbage collection. The reason for this is that the middleware may want to do a little more tidying up, but generally it is expected that it will terminate the current Java VM fairly quickly. Hence there is unlikely to be a need for any further garbage collection, which rather would represent an unnecessary waste of time. A similar policy is adopted whenever the processing of FIG. 9 indicates that the Java VM is dirty.

Assuming now a negative result from step 1015 or 1020, the stacks and registers are now examined for any potential references to the middleware heap (step 1021). If any such references are found, these are again checked to see if they could be objects (step 1022), using essentially the same checks as described in relation to step 1020. If any such potential reference is indeed to an object, than as described in more detail below, a card table is marked accordingly. As previously mentioned however, the presence of such references from a stack or register into the middleware heap is not a problem as far as reset is concerned. Note also that in the preferred embodiment, the scans of steps 1015 and 1021 are in practice combined into a single logical scan.

The Java VM refresh now continues with an examination of the primordial statics fields (step 1025) to see what objects they reference. Since these fields will be retained through the Java VM reset, it is important that the objects that they reference, either directly or indirectly, are likewise retained. If however the referenced objects are application objects (tested at step 1030) then clearly these cannot be retained, because the application has essentially terminated, and the purpose of resetting the Java VM is to allow a new application to commence. Therefore, if the primordial statics do reference an application object, then the Java VM is marked as dirty, and the method proceeds to error 1099.

Assuming that the objects in the transient heap referenced by the primordial static fields are not an application objects (typically they will be primordial object instances or arrays), then these are moved ("promoted") from the transient heap to the middleware heap (step 1035). The reason why such objects are placed on the transient heap initially is that at allocation time, it may not be known that the object to be allocated is a primordial static variable, or reachable from one. Since a promoted object is now newly on the middleware heap, it is necessary to examine any references that the promoted object itself contains. This is described in more detail below. To allow other objects which reference the promoted object to locate its new position, a sort of forwarding address is temporarily stored in the original location of the promoted object. This forwarding address can be deleted (along with the rest of the transient heap) once all the other objects have had their reference to the promoted object properly updated.

(Note that this promotion of objects bears some similarities to generational garbage collection, in which new objects are initially allocated to a short-term heap, and then promoted to a longer-term heap if they survive beyond a certain time, but the criterion for promotion is different: essentially it is based on object type or usage, rather than age. Generational garbage collection is discussed further in the book by Jones and Lin referenced above).

After the primordial static objects have been promoted, the next step is to review the card table. The card table is shown as block 536 in FIG. 5, and in more detail in FIG. 12. The card table comprises pairs of bytes, each pair corresponding to a fixed unit of the heap (for example 512 bytes), and comprising one byte from a first column, 1301, and one byte from a second column, 1302. The first column is used to indicate a card that is potentially dirty (containing a pointer from the middleware heap into the transient heap, hereinafter termed a crossheap pointer), and the second column is used to indicate a card that is live (and so cannot be garbage collected).

Figure 11:
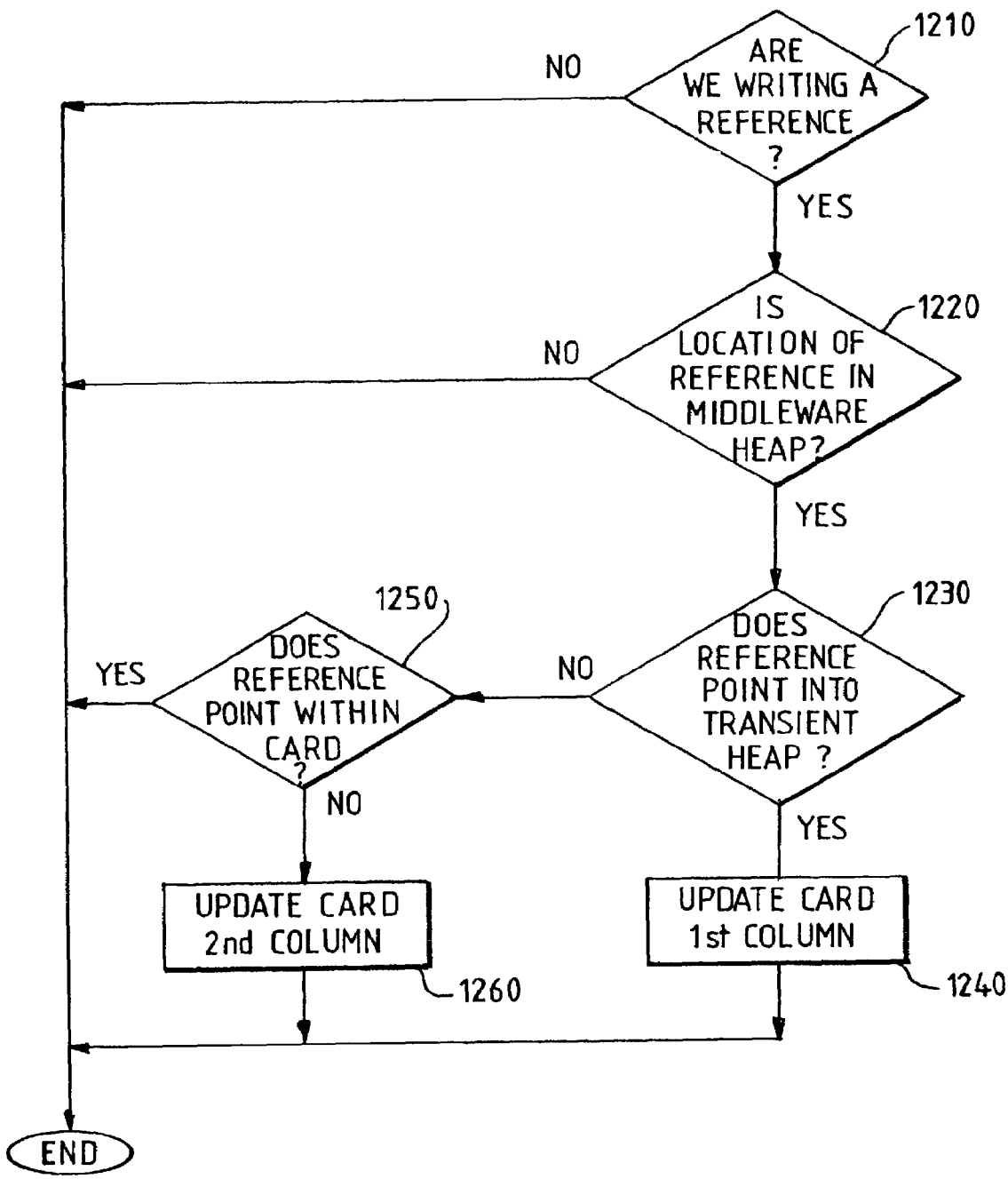
FIG. 11 is a flow chart depicting a write barrier for writing to the card table.

The operation of the card table is shown in FIG. 11. This depicts a write barrier that is triggered by an update to an object during normal processing of the transaction (i.e. prior to reset). The first step of this processing (step 1210) is a test to see whether or not the update involves writing an object reference into the heap. If not, some other piece of data (such as an integer field) that cannot represent a pointer into the transient heap is being stored, and consequently the method exits.

On the other hand, if the data being stored is indeed an object reference, then a test is made (step 1220) to determine whether the object reference is being written into the middleware heap; if not, the method again exits. Next a test is made to determine whether the object reference points to the transient heap (step 1230). The tests of step 1220 and 1230 can both be implemented using the lookup table structure described in relation to FIGS. 7 and 8.

It will be appreciated that a positive outcome from step 1230 indicates that we are writing a crossheap pointer, i.e. one from the middleware heap into the transient heap. Therefore the card in the first column 1301 of the card table that corresponds to the object having the reference written into it is updated to a predetermined value (step 1240). More precisely, the card updated corresponds not to the unit of the heap which contains the updated object reference itself, but rather to the unit of heap which contains the top of the object that includes the new or modified reference (for a small object these may of course be the same).

Figure 12:
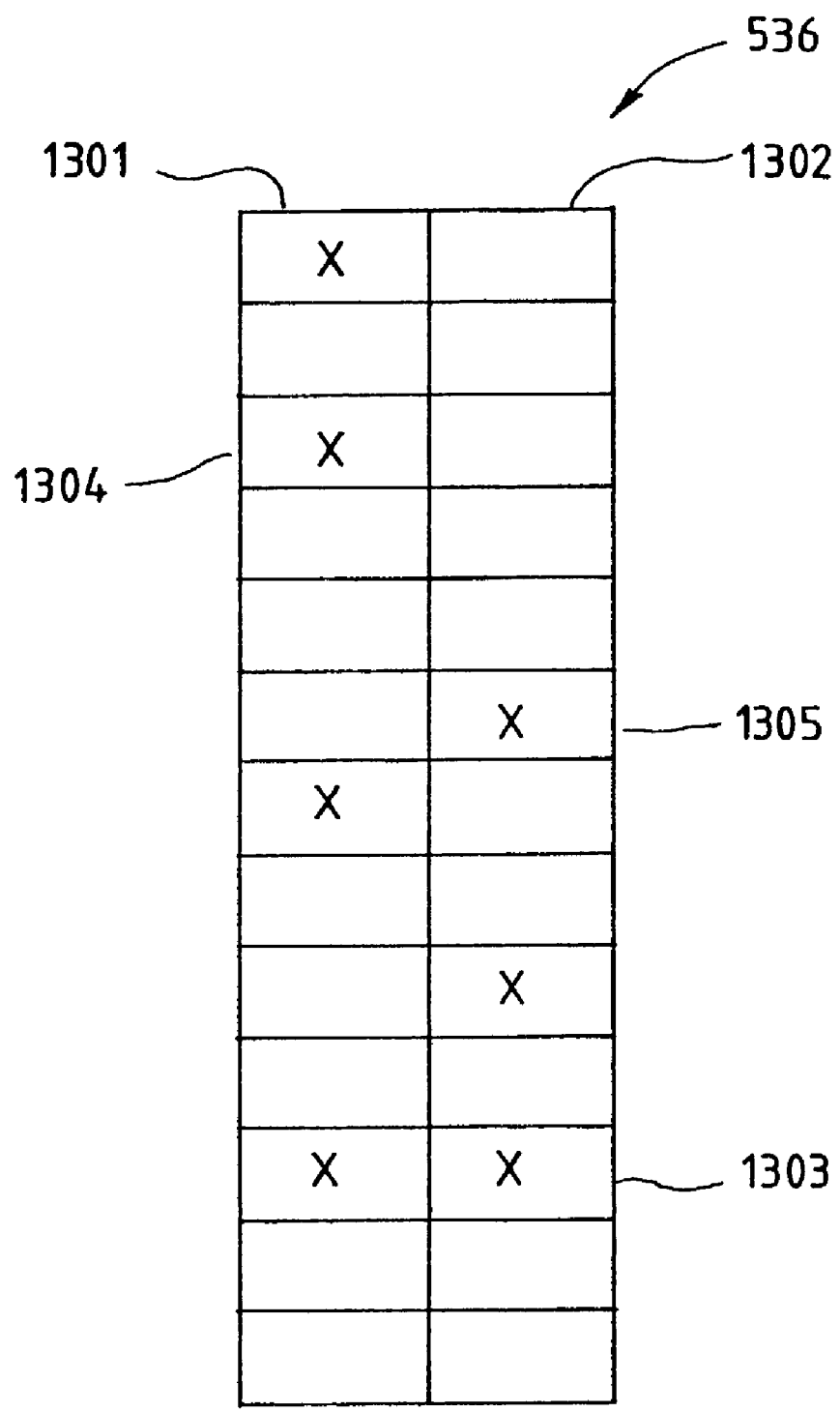
FIG. 12 is a diagram illustrating the structure of the card table.

FIG. 12 illustrates certain cards that have had their first byte updated to the predetermined value as signified schematically by an "X" (eg card 1304). Marking the first column 1301 of the card table in this manner indicates that the relevant card is dirty, in the sense that it (or more accurately, its corresponding unit of the heap) presently contains a crossheap pointer. However, it should be appreciated that this does not necessarily imply, at reset, that the Java VM itself is dirty, since the reference may have subsequently been modified or deleted.

Returning now to step 1230, if this produces a negative result, then this implies that the reference is to an object on the middleware heap itself. A test is then made (step 1250) to determine whether the referenced object is in the same heap unit (i.e. corresponding to the same card) as the object from which the reference is made (again this is based on the unit of heap which contains the start of the relevant objects). If the referenced object is in the same card as the referencing object, the method exits. However, if this is not the case, the card corresponding to the unit of the heap containing the referenced object has its entry in the second column 1302 of the card table updated to a predetermined value. This effectively means that the unit of memory corresponding to the card is potentially "live". FIG. 12 also illustrates certain cards which have had their second byte updated to the predetermined value (which need not be the same as used for the first byte), as signified schematically again by an "X" (e.g. card 1305).

Given that the processing of FIG. 11 represents a write barrier which is performed each time an object reference is updated, it is important that it proceeds as quickly as possible. This explains why each card comprises a pair of bytes, despite each byte containing only a single bit of information. The Java language does not directly support bit operations, but rather operations on whole bytes can be performed more quickly (in other languages such as C which do support bit operations for example, it may be appropriate to have the card table as some kind of bit map).

Given that bit operations are not supported, the reason for having two separate bytes, one to mark as dirty, one to mark as live, is again to allow the update to be performed as quickly as possible. This can be seen by considering the situation where only a single byte is used to store both pieces of information (eg 0 for not dirty, not live; 1 for dirty, not live; 2 for not dirty, live; 3 for dirty, live). With this arrangement, the update at step 1240 would need to write 1 if the original value of the byte were 0, and 3 if the original value of the byte were 2. Thus a test would be needed on the original value of the byte, which increases path length.

Even more significantly, if both aspects were encoded into the same byte, it would be necessary to lock the card in order to perform an update. Otherwise, consider two processes that simultaneously try to access a card, and that both read its initial value as 0. If one process is trying to update the card to 1, and the other to 2, the result will be unpredictable (1 or 2, depending on which process completes last), and in any event incorrect, since the true new value should be 3. This inconsistency could only be overcome by locking the object during the read/write operation on the card, which is a very time-consuming requirement.

Instead, by having separate bytes to indicate dirty/non-dirty and live/non-live, the need for locking and any comparison with the current card value is eliminated. Thus the initial setting of a card is always non-live and non-dirty. Any updates made to it by step 1240 then set the first component to dirty, and any updates made to it by step 1260 set the second component to live. Therefore even if multiple processes try to update the card simultaneously at step 1240, the result will always be the correct one (that the relevant card component is marked as live and/or dirty) irrespective of the order in which the updates are actually applied.

Figure 9A:
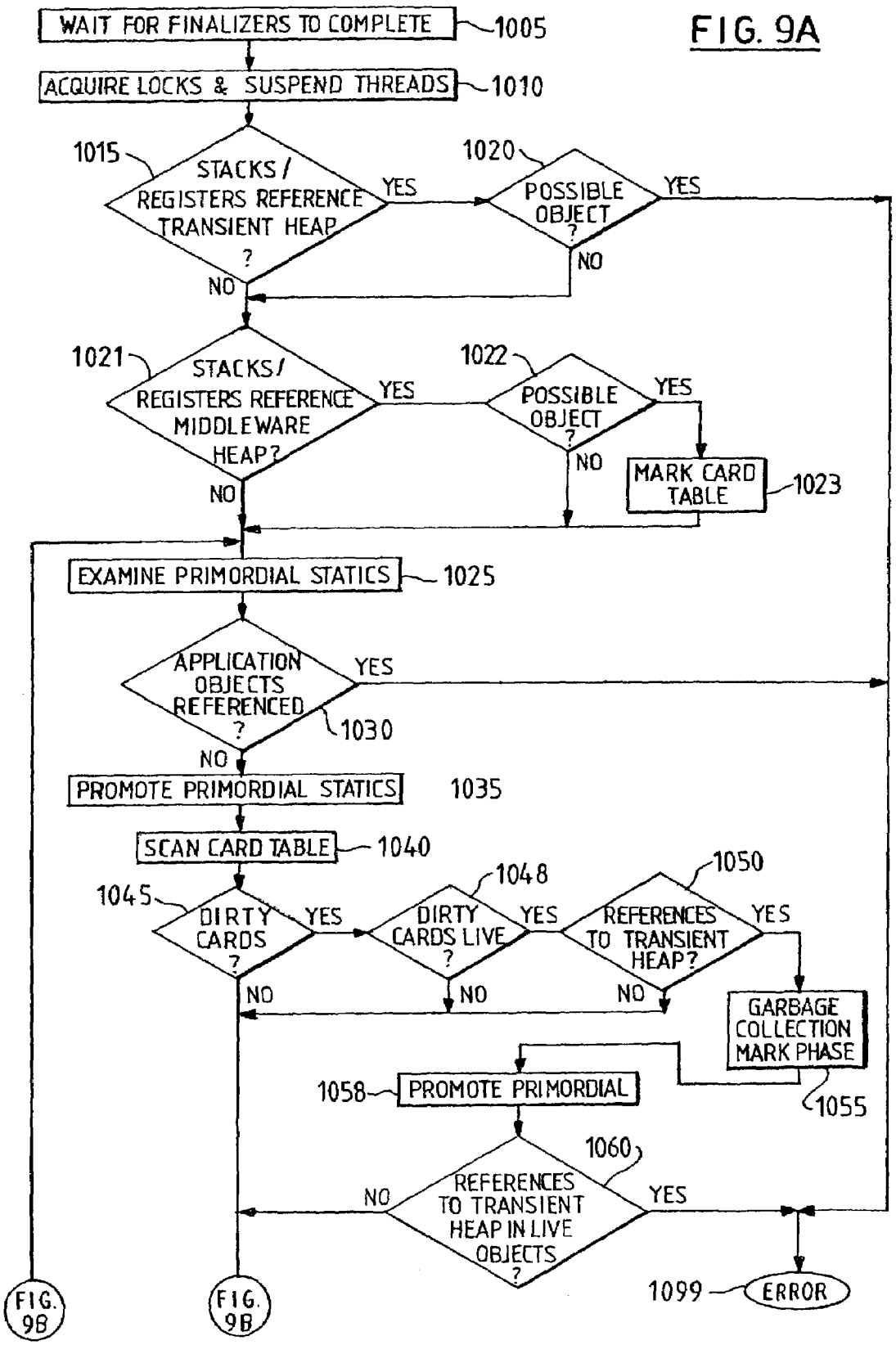
FIGS. 9A and 9B form a flowchart illustrating the operations taken to delete the transient heap during Java VM reset.
Figure 9B:
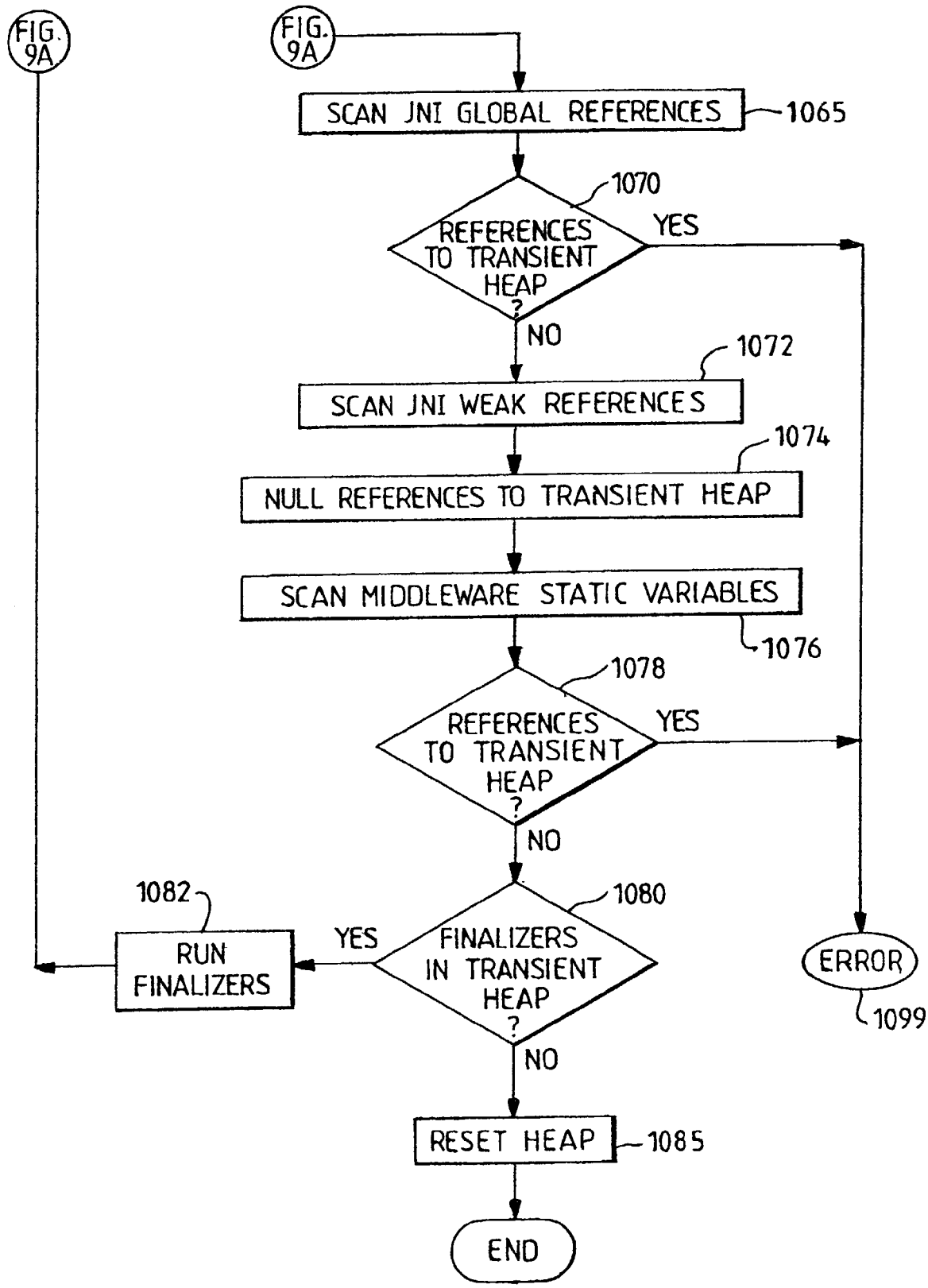

The processing shown in FIG. 11 is also relevant when promoting an object, as described at step 1035 in FIG. 9A, albeit with certain changes. Thus the promoted object is examined to see if it contains any references (corresponding to step 1210). If so, we pass directly through to the positive outcome of step 1220 (since we know that the newly promoted object must be in the middleware heap), to determine where each reference points. If a reference points into a different card in the middleware heap, then this produces a negative outcome at steps 1230 and 1250, and leads to updating the second column of the card table (step 1260); as before, the card updated corresponds to the portion of the heap containing the referenced object. On the other hand, if a reference points to the transient heap, then updating the first column of the card table of step 1240 as shown in FIG. 11 is replaced by one of two different actions, depending on the nature of the object referenced. In particular, if the object referenced is an application object, then analogous to step 1030, this leads to an error preventing reset (step 1099). Alternatively, if the object referenced can be promoted, then this is done, which effectively takes us back to step 1035. The newly promoted object must then be scanned itself for references, and we again go through the processing of FIG. 11 (modified as described above). This processing is repeated for each object reference in a promoted object, which in practice can sometimes lead to whole chains of primordial objects being promoted at this stage.

It will be appreciated that the structure of the card table shown in FIG. 12 is illustrative only, and may be adapted to any suitable configuration for performance reasons, especially speed of access. For example, it may be decided to have the second column 1302 following the first column 1301 in memory, rather than having byte pairs for a single card adjacent to one another. It will also be appreciated with respect to the flowchart of FIG. 11 that various modifications could be made. Thus one possibility is to move step 1240 up before step 1220, so that marking the first card simply indicates any pointer update (rather than specifically a crossheap pointer). This change would make it slightly easier to support the option of a simplified write barrier, as discussed below, where reset performance is not a major concern.

Returning now to FIG. 9, the first column of the card table is scanned (step 1040), one card at a time, during reset of the Java VM. More particularly those cards which correspond to the region currently assigned to the middleware heap are scanned. Thus cards for the transient heap 520 and for the unassigned region 510 are not scanned. As part of this review, it is first determined for each card if it is marked as dirty (step 1045); i.e. whether the first byte in FIG. 12 is set for that card. If so, this indicates that a crossheap pointer has been stored in the corresponding portion of the middleware heap since the last Java VM reset, and so it must be checked to confirm that it does not still validly point to the transient heap.

Consequently, in step 1048 it is determined whether the relevant object is potentially live, by examining the second byte in the card table pair (i.e. from column 1301 in FIG. 12). If this second byte is not set, and assuming the card is not otherwise referenced (see below) the card cannot be live (an example of such a card is 1304 in FIG. 12). Thus the object that contains the crossheap pointer that originally triggered marking the card as dirty is no longer valid because it is not now being used. Consequently this card can be ignored, and the scan of the card table can continue to the next card. If it turns out that there are no cards in the card table that are marked as both dirty and live, then the negative path from step 1048 can be followed to the next stage of processing (see FIG. 9B).

To understand why the card table 536 successfully identifies those cards which potentially contain live objects, an object is only live if it is referenced directly or indirectly from a root. Now in step 1023 described above, all cards containing a root (i.e. a reference from a stack or register) are marked at reset in the second column. This caters therefore for all the direct references from a root. As regards any indirect reference from a root, this must be via an object, and the write barrier of FIG. 11 marks all those cards containing objects that are referenced from elsewhere (including allowance for promoted objects as described above).

In particular, the process of FIG. 11 marks the cards for objects on the middleware heap as they are referenced, with two exceptions. Firstly, with respect to the test of step 1220, if the referencing object is located in the transient heap, then the second column of the card table is not marked. This is because it is assumed that the referencing object will be deleted along with the rest of the transient heap at reset; should this not be the case (because the object on the transient heap is referenced for example from the stack), then this will already have been detected (e.g. at step 1015), and reset prevented. In other words, a reference at reset to a middleware object from an object on the transient heap cannot make the middleware object live in this context; either the transient object itself is dead, in which case the reference can be ignored, or the transient object is still live, in which case reset is prevented and effectively the whole system must be terminated.

The second exception for marking the second column of the card table is that, as per step 1250, a reference to another object in the same card does not need to be marked. This is because this card will be marked as long as the referencing object is still live; if the referencing object is not live, then the referenced object can likewise be ignored.

To see this more clearly, consider an object A. If object A in a card is a root, then the card will be marked in accordance with step 1023. On the other hand, if the card is not marked as being a root, then object A is only live if pointed to from a root. Thus there must be a chain of one or more references from a root to the card for object A (otherwise we can be certain that all the objects in the card of object A are no longer live). This chain from a root into the object A must at some stage in its length pass from outside the card containing object A (since the chain starts with a root which is outside this card), into the card containing object A, in order for it to terminate on object A. Thus as long as we pick up the chain on entering into the card of object A (which should produce a negative test at step 1230), and then mark this card as live, we have no interest in any further length of the chain lying purely within the card corresponding to object A.

Figure 10:
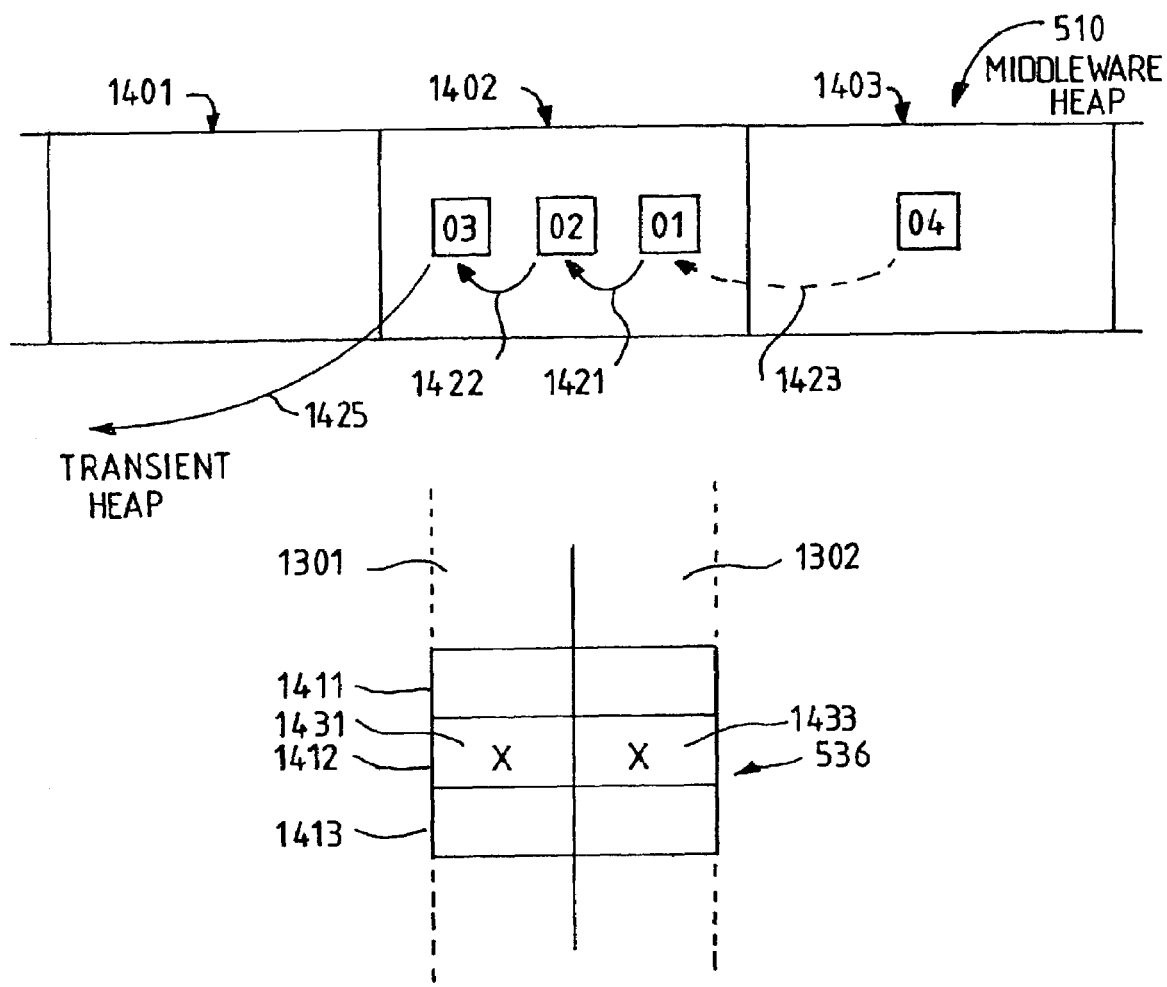
FIG. 10 is a diagram illustrating some objects in memory and the corresponding portion of a card table.

To illustrate the above, FIG. 10 depicts a section of middleware heap 510 and card table 536, showing three cards 1411, 1412, and 1413, together with their corresponding heap sections 1401, 1402, and 1403 respectively. Heap section 1402 contains object O1, which in turn references object O2 via pointer 1421, and object O2 in turn references object O3 via pointer 1422. When writing both pointer 1421 and pointer 1422, the test of step 1250 is positive, and so no entry is made into either column of the relevant card 1412. Next, assume that a pointer 1425 is created from O3 into the transient heap. Now an entry is made into the first column of card 1412 (marked as 1431 in FIG. 10), to show that an object within this card has been updated to contain a reference to the transient heap (i.e. it is potentially dirty). Finally, when the pointer 1423 from O4 to O1 is created, this does represent a middleware reference from one card to another. Consequently, the second column of the card table for the card corresponding to O1 is also updated (mark 1433) to show that this card is potentially live.

Returning to step 1048, as soon as a card is located that is marked as both dirty and also as live (an example of such a card is 1303 in FIG. 12, or card 1412 in FIG. 10), then there is potentially a live crossheap pointer that could prevent reset. However, this is not certain, because we only know that the relevant card contained at one time firstly an object with a crossheap pointer and secondly an object that is live—we do not know that these are actually the same object, in other words that the crossheap pointer still exists, or that the object containing it is live (the card could be marked as live because of a reference to some completely different object in the card).

To see this more clearly, if we remove pointer 1421 from O1 to O2, then the card table would not be changed, but only O1 would be potentially live via the reference from O4—not O2 or O3. Therefore the cross-heap pointer 1425 from O3 can in fact be ignored. However, the card table lacks the granularity to make this determination. It should also be noted that we have effectively assumed that O4 is live, although this may not necessarily be the case. Thus the design of the card table is conservative, in that it marks everything that may possibly be dirty and live, even although neither of these may actually be true of any object within the card at reset.

Accordingly, as soon as a card is found which does produce a positive outcome to step 1048, further testing must be done to see if there is a genuine problem. The first part of this testing looks at all the object references in objects which start in the heap unit corresponding to the marked card. For all objects associated with a marked card, all references contained in those objects (even if the references themselves are outside the unit of the heap corresponding to the card) are checked to see if they point to the transient heap (step 1050). If they do not, for example they contain only null pointers, and/or references to the middleware heap, then this is not a problem for Java VM reset, and we can continue with the scan of the card table (step 1040). On the other hand, if there are any such pointers to the transient heap from the middleware heap, this will be a problem on reset since those references will no longer be valid once the transient heap is cleared. The exceptions to this are where the objects containing these problematic references are no longer live (i.e. could be garbage collected), or are primordial and can be successfully promoted.

Note that in step 1050 there is no need to perform tests analogous to step 1020 to see if the address does correspond to an object (such as being on an 8-byte boundary, etc). This is because the scan card process uses the known class structure of an object to specifically pick out any object references therein, rather than simply looking for some data value that may potentially represent an object reference to an address in the transient heap.

On a positive outcome to step 1050, and indeed immediately a single such reference is found (because this is enough to potentially prevent reset) the system performs the mark phase of a garbage collection (step 1055), which is a relatively long operation. The purpose of this garbage collection is that if the problematic (cross-heap) references are in objects which are marked (i.e. live), as tested at step 1060, then the JVM must be regarded as dirty; hence the method proceeds to error 1099. On the other hand, if the problematic references are in objects which are not marked, then these references can effectively be ignored, since these objects are no longer live.

A further possibility as mentioned above is that the reference is actually to a primordial object which can be promoted into the middleware heap. This processing is shown as step 1058 in FIG. 9, is largely analogous to step 1035 (which only promoted a limited subset of primordial objects, namely those referenced by primordial statics). Any such promoted objects also now need to be checked for any pointers back to the transient heap. In some situations this can lead to a chain of primordial objects being promoted from the transient heap back up to the middleware heap. (Note that although step 1058 is shown separately from the GC mark phase in step 1055 in FIG. 9A, they are actually performed together in the preferred implementation.)

One complication is that the heaps may have been compacted during a transaction, as previously described in relation to garbage collection. This then invalidates the card table. In such cases a full scan of the middleware heap is then performed automatically to locate any object references to the transient heap, equivalent to the garbage collection mark phase of step 1055. Note however that compaction is such a long operation that in this case the extra time taken at reset is, in relative terms, not so important. As previously indicated, the intention is that most transactions will not require garbage collection (or compaction).

Assuming that the test of step 1060 produces a negative output (i.e. no live middleware references to the transient heap), the method proceeds to scan for Java Native Interface (JNI) global references. These are references which are used by native code routines (i.e. running directly on OS 30 rather than on Java VM 40, see FIG. 1) to refer to Java objects. Using the JNI such references can be made global, that is available to all threads, in which case they will exist independently of the thread that created them. All such JNI global reference slots are scanned (step 1065) (see FIG. 9B) and if a reference to the transient heap is found (step 1070) the Java VM is marked as dirty (i.e. error 1099), since these references will clearly fail once the transient heap is reset.

Providing this is not the case, the JNI weak references are scanned next (step 1072). These are references which the application specifies using JNI as expendable, in that they can be deleted if no longer used. According, any such weak JNI references to the transient heap that are found can be nulled (step 1074), thereby permitting the Java VM reset to proceed.

Next, the static variables of all middleware classes are scanned (step 1076) to see if any directly reference the transient heap (step 1078). Note that these won't previously have been examined, since they are on the system heap rather than the middleware heap. If a direct reference to the transient heap is found, the Java VM is dirty, corresponding to error 1099. (Note that unlike for the primordial statics (step 1025) there is no need to iteratively follow references from the middleware statics, since any indirect references will already have been picked up by the preceding analysis).

If no transient heap references are found, the processing continues to step 1080 in which objects on the transient heap are reviewed to see if any have finalizer methods, and any that are found are now run (step 1082). One important aspect of the preferred embodiment is that these finalizer methods are run on the main thread, rather than being passed to the system finalizer thread. An implication of this is that the finalizer methods will be run in the known and controllable context of the main thread. In addition, it is ensured that the finalizer methods complete before progressing to the next stage of the Java VM reset. Unfortunately, finalizer methods can create fresh objects, which may newly reference the transient heap. Therefore, after the finalizer methods have completed, processing must return to step 1025 to repeat much of the checking, to ensure that the system is still in a position for Java VM reset. In theory, if the finalizer methods have created new objects on the transient heap which themselves have finalizer methods, then this loop may have to be followed more than once.

Note that strictly speaking there is no formal requirement to run the finalizers at this stage, since this is the point at which the Java VM would normally terminate at the conclusion of an application, rather than having a garbage collection performed. Nevertheless, the policy in the preferred embodiment is that object finalizers will be run before deletion at JVM reset, although other implementations may have different policies.

It is assumed that eventually all finalizers will be run, resulting in a negative outcome to the test of step 1080. In these circumstances, the method proceeds to step 1085, which represents reset of the Java VM by deleting the transient heap. In practice, this involves several operations. Firstly, if the mark phase of the garbage collection was run (step 1055) then the sweep phase, which is relatively quick, is now run on the middleware heap. Next, various operations are performed to formally reset the transient heap, including: the removal of all transient heap monitors and the freeing of storage for transient heap class blocks (i.e. releasing the storage utilised by the class block, which is not on the heap). The transient heap pointers can now be reset so that the heap is effectively emptied, and restored to its initial size (by setting boundary 522 appropriately).

Once the transient heap has been recreated (although it could be done before), in the preferred embodiment a garbage collection is performed on the middleware heap if either of the following two cases is true: firstly, if the number of slices left in the unallocated portion of the heap, between the middleware heap and the transient heap, is less than two, or secondly if the amount of free space in the middleware heap plus half the unassigned portion 515 of the heap (see FIG. 5) is less than the amount of storage used by the previous transaction times three. Both of these can be regarded as a preemptive garbage collection, performing this operation now if the next transaction would otherwise probably be constrained for space, in the hope that this will avoid a garbage collection during the transaction itself. Note that in the current implementation this preemptive garbage collection would be performed irrespective of whether a garbage collection mark phase was performed in step 1055. Finally, all the threads can be restarted and the garbage collection locks released, whereupon the reset is completed, and the Java VM is available to support the next application.

One aspect that has not been discussed yet is reset of the card table. For the first column of the card table, this is relatively straightfoward; the first column can be reinitialised (i.e. everything set as clean) as part of the heap reset (step 1085). The situation with regard to the second column of the card table however is slightly more complicated. Since middleware objects persist across the reset, the "live" markings from one middleware object to another must also persist across reset. The natural consequence of this, if no further action is taken, would be that more and more cards have their second column marked as live, and so the benefit from the test of step 1048 would reduce—i.e. it would rarely test negative.

However, it is possible to reset the second column of the card table whenever a garbage collection is performed. More particularly, after a garbage collection, the middleware heap will only contain live objects. Thus any card which is marked as live, but which no longer contains any objects (these having been deleted in the garbage collection), can now be reset back to not live. An alternative (equivalent) approach is to reset the entire second column of the card table to zero (unmarked) at the start of garbage collection, and then specifically mark those cards still containing objects at the end of garbage collection. It will be appreciated that such a reset of the second column of the card table at a garbage collection works even if a compaction is performed, since the reset of the second column of the card table can be delayed until after the compaction is complete, and the values of the cards then simply adjusted to indicate the (new) locations of the live objects.

The reset of the second column of the card table is actually-self-correcting to some extent, in that it can also be performed after the GC mark phase of step 1055 in FIG. 9A. Thus if the card table contains too many cards marked (potentially spuriously) as live, then this increases the likelihood of a positive outcome from step 1048, which in turn will lead to the GC mark phase of step 1055 (assuming a positive outcome from step 1050). This in turn can reset the second column of the card table, making it more effective for the next transaction.

Note that in practice it has been found that although the initial transaction on a Java VM may utilise objects from many cards, for subsequent transactions the number of cards used may be very small (typically only a handful). This means that the technique disclosed herein will tend to perform particularly well after a first garbage collection resets of the second column of the card table.

Although one preferred embodiment of the invention has been described in detail above, the skilled person will be aware of many possible variations this embodiment. For example, it will be appreciated that the purpose of the second column in the card table is to allow a rapid determination of whether a dirty card is dead, thereby permitting any crossheap pointers that it contains to be discounted. However, this is at the expense of a moderately complicated write barrier, as discussed in relation to FIG. 11. Thus the benefit to be obtained by this approach will depend on whether the increase reset speed (by hopefully avoiding a garbage collection mark phase) will compensate for the reduced execution speed during the body of the application.

Since this trade-off is likely to be application dependent, in the preferred embodiment, the Java VM has a setting which allows the write barrier of FIG. 11 to be modified for applications in which execution speed during the transaction is especially critical (or where reset speed is not a problem). In this setting, only the first column of the card table is utilised (1301 in FIG. 12), and the write barrier of FIG. 11 simply reduces to steps 1210 and 1240 (which do not involve any testing as regards heap location). In addition, the test of step 1048 in FIG. 9A is removed, with a positive outcome to step 1045 leading directly to step 1050, and then on into the garbage collection mark phase if any crossheap pointers are found.

It will be appreciated that many of the other details of the systems and processes discussed above are exemplary only, and can be varied according to particular circumstances. Thus further modifications to the embodiments described herein will be apparent to the skilled person yet remain within the scope of the invention as set out in the attached claims.

The invention claimed is:

1. A method of running one or more programs on a computer system including a memory in which objects are stored, said method comprising the steps of:
    providing a card table containing multiple cards, each card corresponding to a portion of said memory; and
    detecting with a write barrier that a first object has been updated by a program to include a reference to a second object, and marking the card that corresponds to the memory location of said second object,
    wherein the card table is adapted to enable a Java Virtual Machine to begin a second application after a first application has run to completion by resetting the Java Virtual Machine without restarting the Java Virtual Machine and without performing garbage collection;
    wherein said memory is divided into at least first and second heaps;
    wherein each card comprises first and second components, the first component being marked if an object in a corresponding memory location is updated to include a reference to another object, and the second component being marked if and object in a corresponding memory location is referenced from another object;
    wherein the method further includes performing a reset including:
      marking the second component of each card corresponding to a memory location referenced by the system stack or registers;
      detecting if the first component of any card corresponding to objects in the first heap is marked;
      responsive to so detecting, for determining if the second component of any such card is marked; and
      responsive to determining that no cards have both the first and second components marked, proceeding with the reset.

2. The method of claim 1, wherein the card is only marked if the first object is located in the first heap.

3. The method of claim 1, wherein the first component is only marked if the object being updated is in the first heap, and the object being referenced is in the second heap.

4. The method of claim 1, wherein the second component is only marked if the object being updated is in the first heap, and the object being referenced is also in the first heap.

5. The method of claim 4, wherein the second component is not marked if the object being updated and the object being referenced are in memory locations corresponding to a single card.

6. The method of claim 1, wherein if an object is moved from the second heap to the first heap, then any object references within the moved object are regarded as having been updated and the card table is marked accordingly.

7. The method of claim 1, wherein the card table is reset if a garbage collection is performed on the system.

8. The method of claim 1, wherein a reset can be performed on the system, involving the deletion of all objects in the second heap, and the first component of each card is restored to an unmarked value as part of such reset.

9. The method of claim 8, wherein the second component of each card is maintained through said reset, and only restored to an unmarked value if a garbage collection is performed on the system.

10. A computer program product comprising instructions on a medium in machine readable form which when loaded into a computer system for running one or more programs and including a memory in which objects are stored, will cause said system to perform the steps of:
providing a card table containing multiple cards, each card corresponding to a portion of said memory; and
detecting with a write barrier that a first object has been updated by a program to include a reference to a second object, and marking the card that corresponds to the memory location of said second object,
wherein the card table is adapted to enable a Java Virtual Machine to begin a second application after a first application has run to completion by resetting the Java Virtual Machine without restating the Java Virtual Machine and without performing garbage collection;
said memory is divided into at least first and second heaps;
wherein each card comprises first and second components, the first component being marked if an object in a corresponding memory location is updated to include a reference to another object, and the second component being marked if an object in a corresponding memory location is referenced from another object;
wherein a reset can be performed on the system, involving the deletion of all objects in the second heap, and the first component of each card is restored to an unmarked value as part of such reset;
wherein the second component of each card is maintained through said resent, and only restored to an unmarked value if a garbage collection is performed on the system; wherein the instructions further cause the system to perform a reset by the step of:
marking the second component of each card corresponding to a memory location referenced by the system stack or registers;
detecting if the first component of any card corresponding to objects in the first heap is marked;
responsive to so detecting, determining if the second component of any such card is marked; and
responsive to determining that no cards have both the first and second components marked, processing with the reset.

11. The computer program product of claim 10, wherein the card is only marked if the first object is located in the first heap.

12. The computer program product of claim 10, wherein the first component is only marked if the object being updated is in the first heap, and the object being referenced is in the second heap.

13. The computer program product of claim 10, wherein the second component is only marked if the object being updated is in the first heap, and the object being referenced is also in the first heap.

14. The computer program product of claim 13, wherein the second component is not marked if the object being updated and the object being referenced are in memory locations corresponding to a single card.

15. The computer program product of claim 10, wherein if an object is moved from the second heap to the first heap, then any object references within the moved object are regarded as having been updated and the card table is marked accordingly.

16. The computer program product of claim 10, wherein the card table is reset if a garbage collection is performed on the system.

* * * * *